United States Patent [19]
Lauer et al.

[11] 3,829,953
[45] Aug. 20, 1974

[54] APPARATUS AND METHOD FOR FORMING INSULATORS AND APPARATUS AND METHOD FOR INSERTING COIL TURN PORTIONS OR INSULATORS INTO THE SLOTS OF A MAGNETIC CORE

[75] Inventors: Richard E. Lauer; Louis W. Pieper, both of Fort Wayne, Ind.

[73] Assignee: General Electric Company, Fort Wayne, Ind.

[22] Filed: July 31, 1972

[21] Appl. No.: 276,789

Related U.S. Application Data

[63] Continuation-in-part of Ser. No. 126,077, March 19, 1971, abandoned.

[52] U.S. Cl.............. 29/205 E, 29/205 D, 29/596, 29/606
[51] Int. Cl....................... H02k 15/00, H01f 7/06
[58] Field of Search.......... 29/205 E, 205 D, 205 R, 29/205 C, 596, 606

[56] References Cited
UNITED STATES PATENTS

| | | | |
|---|---|---|---|
| 3,324,536 | 6/1967 | Hill | 29/606 X |
| 3,402,462 | 9/1968 | Walker et al. | 29/596 |
| 3,505,721 | 4/1970 | Walker | 29/205 R |
| 3,579,818 | 5/1971 | Arnold et al. | 29/596 |
| 3,722,063 | 3/1973 | Arnold | 29/205 R |

*Primary Examiner*—Thomas H. Eager

[57] ABSTRACT

Apparatus inserts side portions of coils and insulators into selected slots of core having given stack height within predetermined range of stack heights. Connector and stop device have selectably variable effective length selected to conform relative travel of parts to given stack height. Effective length of hold-down device position determining mechanism is selectable.

Assembly for forming insulators of a selected length includes feed stop device, having a selectably variable effective length to permit conforming of advanced lengths of insulative material to the given core stack height.

Disclosed are methods of inserting winding portions into slots of a core of a given axial height within a preselected range of axial heights includes selectively setting the length of an increment of relative travel of apparatus parts and a given core; concurrently setting a first position of core securement means; placing portions of at least one coil and then a core in desired relationships relative to coil turn feeder members; moving the core securement means to the first position thereof; and effecting the increment of relative travel of the apparatus parts and core. Also disclosed are methods of forming shaped insulators that include advancing a mechanism and strip of insulative material an amount conforming to a selected length; disengaging the material, and continuing to advance the mechanism without advancing the strip of material.

21 Claims, 26 Drawing Figures

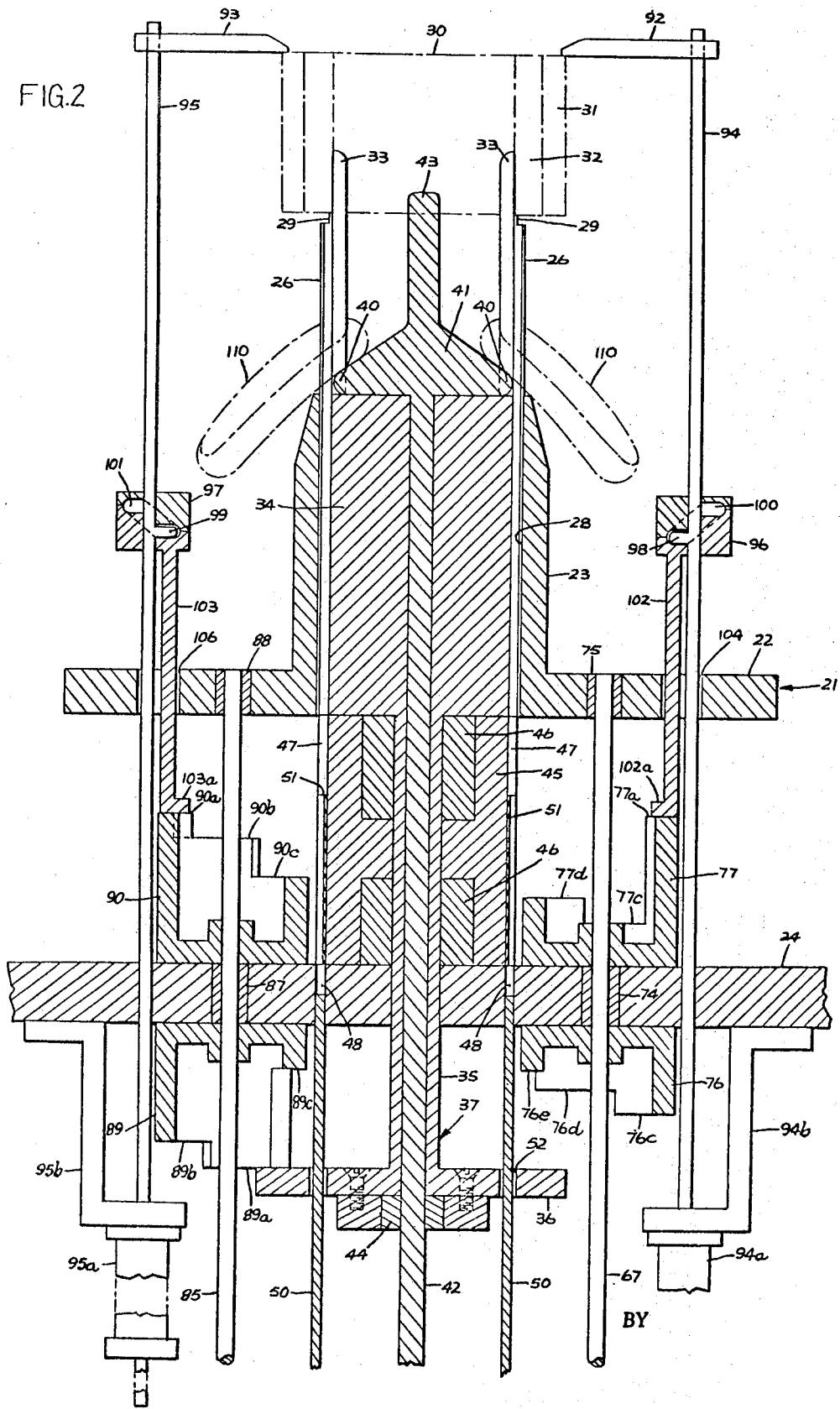

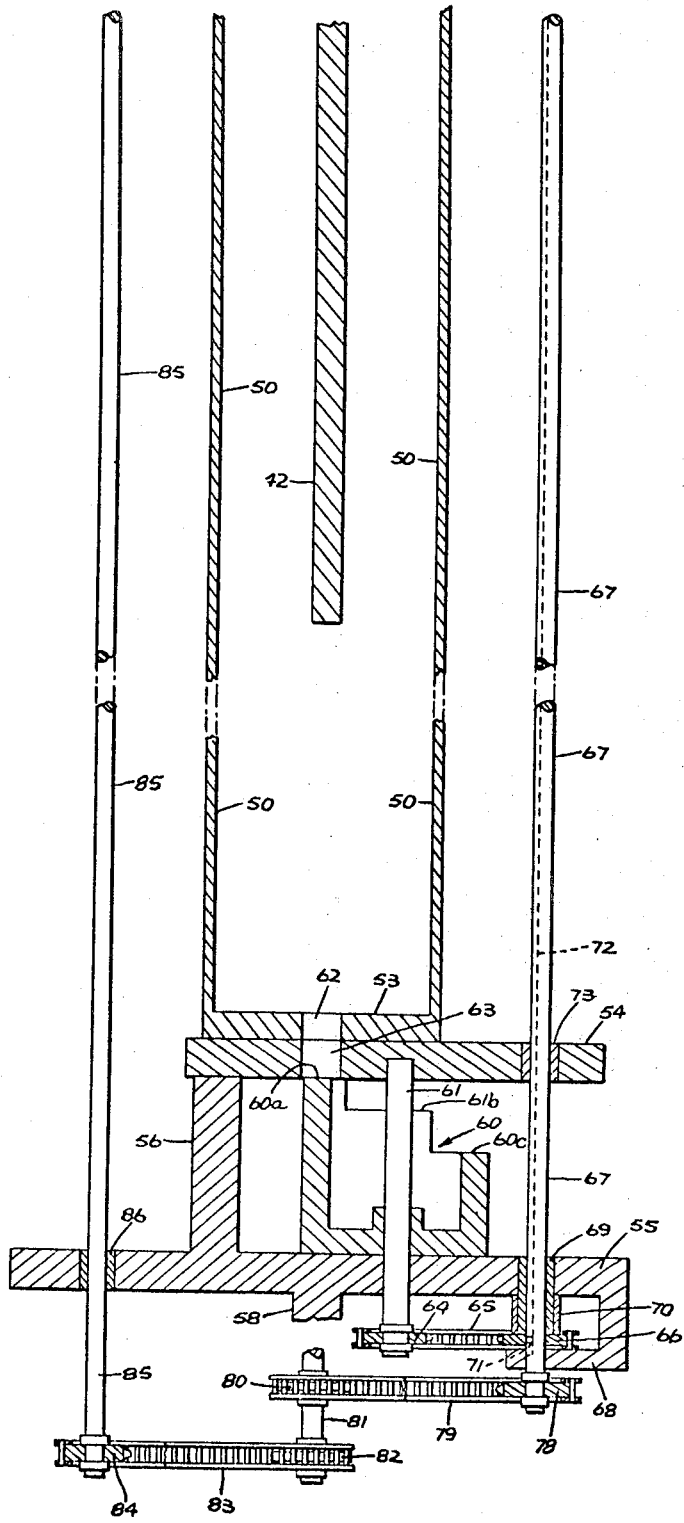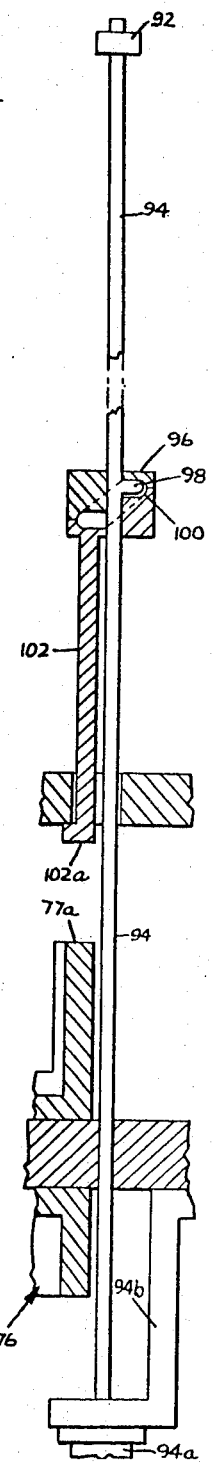

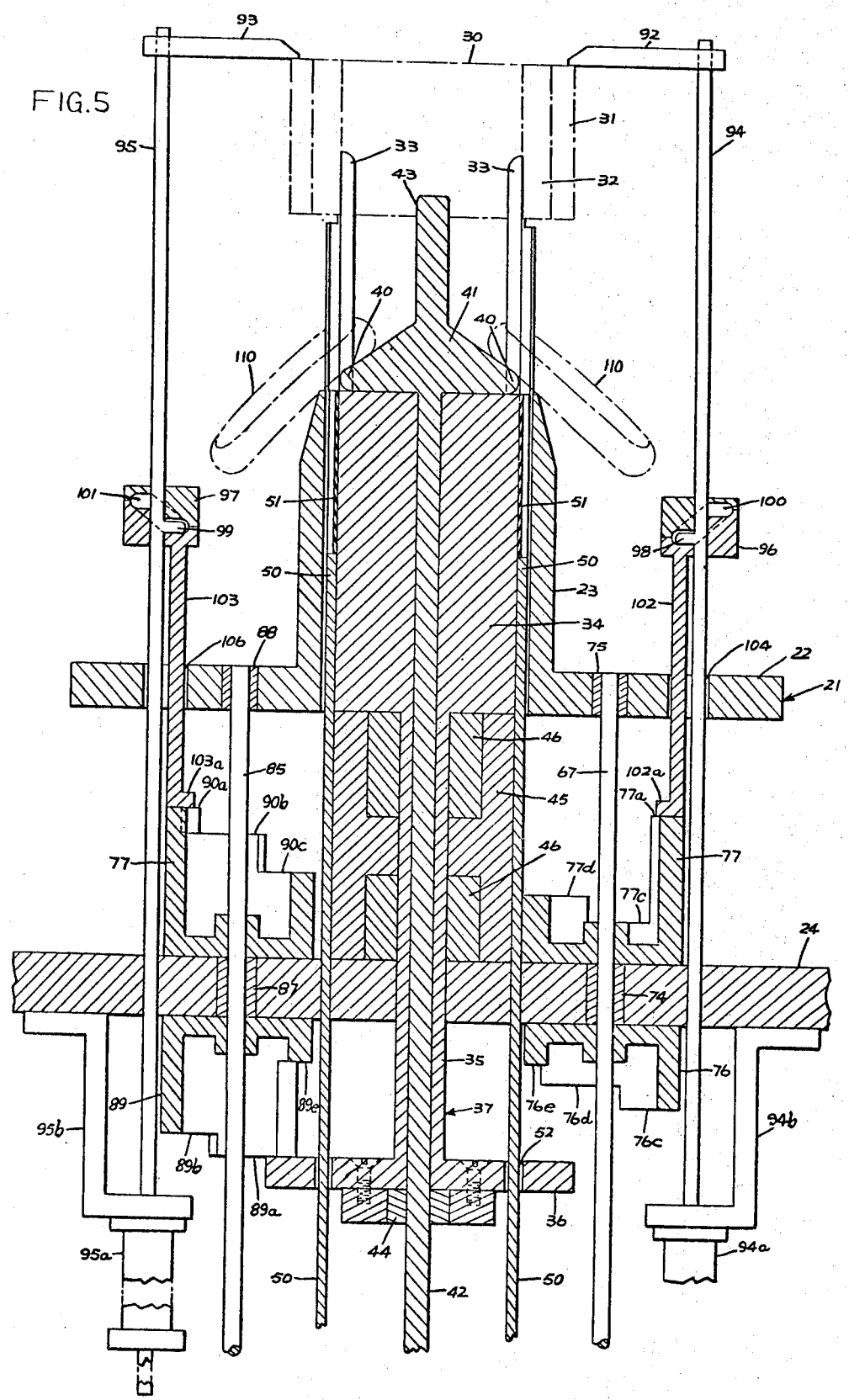

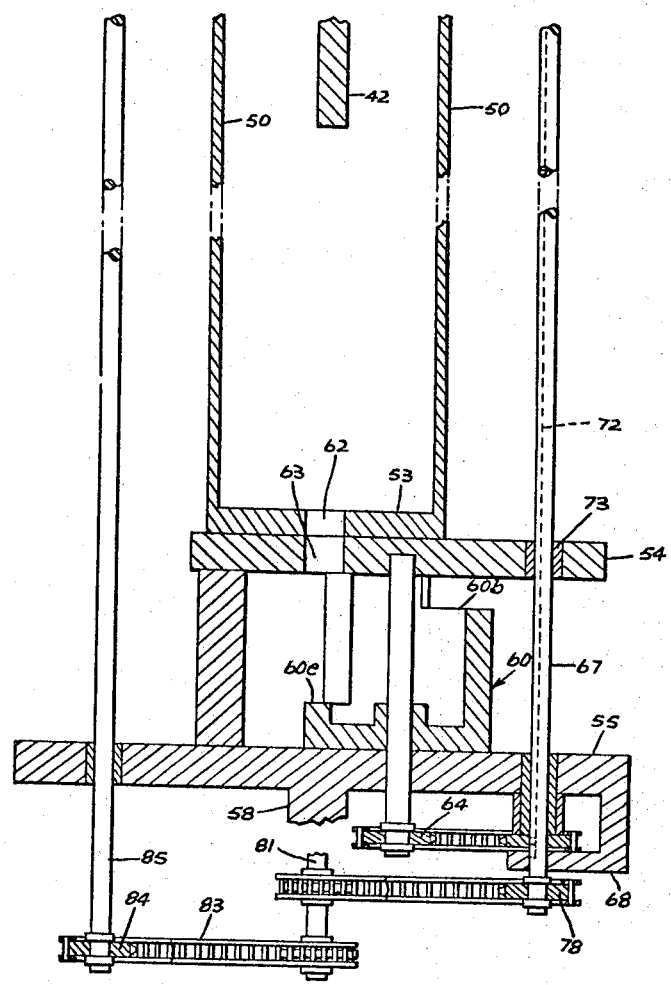

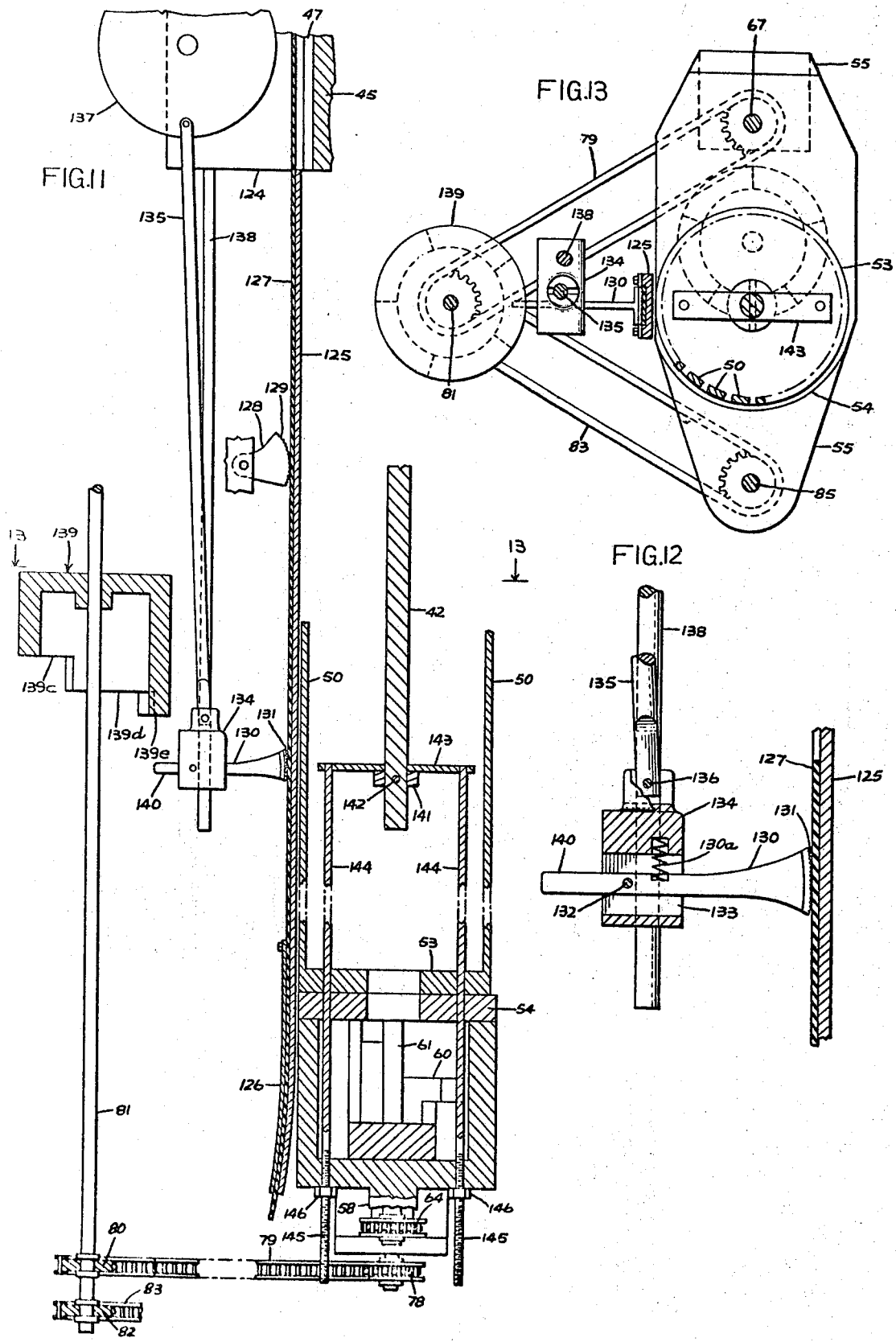

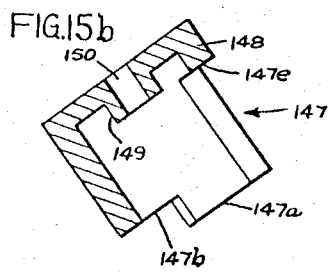
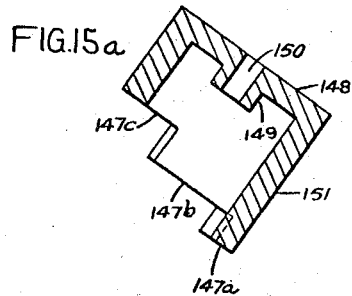
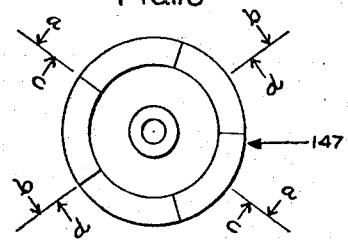
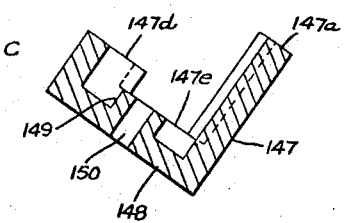
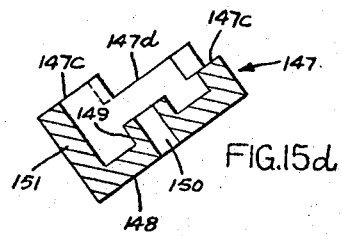
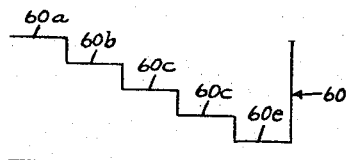
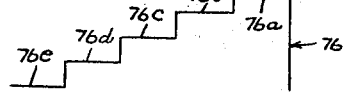
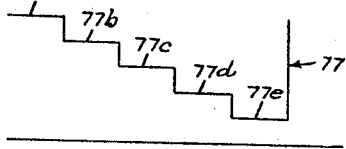
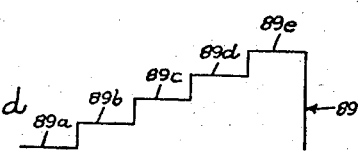
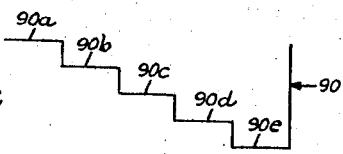
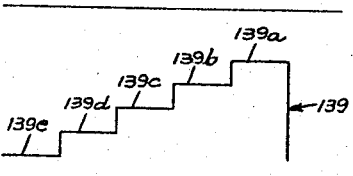

APPARATUS AND METHOD FOR FORMING INSULATORS AND APPARATUS AND METHOD FOR INSERTING COIL TURN PORTIONS OR INSULATORS INTO THE SLOTS OF A MAGNETIC CORE

CROSS REFERENCE TO RELATED APPLICATION

This is a continuation-in-part application of our co-pending application Ser. No. 126,077 which was filed on Mar. 19, 1971; now abandoned.

BACKGROUND OF THE INVENTION

The present invention relates to improved apparatus and methods for inserting coil turn side portions of a group of electrical coils formed of conductor wire, and for forming and inserting associated insulators, when desired, into axially extending slots of a magnetic core.

There have been developed a number of apparatus for inserting coil side turn portions of a group of coils, up to an entire stator winding, and associated insulators into the slots of a magnetic core such as a motor stator for instance. One disadvantage of such machines is that each machine is constructed basically for cores of essentially one stack height, i.e., cores of essentially one given axial length. In order to accommodate cores of varying stack heights tedious and time consuming adjustments are required and, in some cases, certain parts must be completely removed and replaced with other components. Particularly in production type operations this results in costly "down time" of the machine.

Also, with most such apparatus that are capable of simultaneously inserting coil side turn portions and insulators, the insulators are made separately and then either manually or mechanically loaded into the apparatus. When the apparatus is adjusted for a different core stack height, the insulator making mechanism should also be adjusted and care must be taken to make sure insulators of the appropriate length for the new stack height are used.

Copending application Ser. No. 101,638 (now U.S. Pat. No. 3,722,063) of Richard B. Arnold, filed Dec. 28, 1970 and assigned to General Electric Company, assignee of the present invention, shows and describes certain arrangements for adjusting the insertion operation of a coil turn and insulator insertion apparatus to accommodate cores of various stack heights.

It is an object of the present invention to provide an improved apparatus for inserting coil turn side portions, and insulators when desired, into predetermined slots of a magnetic core.

It is another object to provide such an improved apparatus which is quickly and easily adjusted to accommodate cores of different stack heights within a predetermined range of core stack heights.

It is yet another object to provide such an improved apparatus which provides exact adjustment for different predetermined core stack heights.

It is a further object of this invention to provide such an improved insertion apparatus in which the core securement means is also automatically adjusted to accommodate various core stack heights.

It is a further object to provide an improved apparatus including an insulator making assembly which is automatically adjusted to provide insulators for cores of different stack heights.

Yet another object of the present invention is to provide an improved mechanism for forming shaped insulators from a strip of insulative material which is adjustable to provide insulators of different predetermined lenghts.

Still other objects of the present invention are to provide new and improved methods for inserting coil turn portions, and insulators when desired, into slotted structures; and methods for forming shaped insulators.

SUMMARY OF THE INVENTION

In carrying out the objects of our invention, in one form thereof, we provide improved apparatus for inserting coil side turn portions of a group of electrical coils formed of conductor wire into predetermined axially extending slots of a magnetic core of a given stack height within a preselected range of stack heights and having axially extending slots in communication with a periphery of the core. The apparatus includes means defining a plurality of turn-receiving gaps and turn insertion means for inserting coil side turn portions into the predetermined slots of the core. There is supporting means for mounting the turn insertion means and core for relative movement in an axial direction and driver means for effecting movement of the turn insertion means relative to the core during a selected increment of travel of the driver means. There also is a connector device or control means, having a selectively variable effective height or length, to operatively interconnect the driver means and the turn insertion means to move the turn insertion means relative to the core during the selected increment of travel of the driver means. Elective means is provided for adjusting or moving the control means so that the portion of the control means which effectively interconnects the driver means and the turn insertion means is of a selected dimension such that the selected increment of travel of said driver means (during which movement of the turn insertion means occurs) corresponds to the given core stack height.

In accordance with another aspect of the invention there is core securement means, having a selectable first position restraining the core from axial movement and a second position removed therefrom. When desired, there is also provided power means effective selectively to move the securement means between its first and second positions. There also is position determining means that is variable in effective length or height, associated and interconnected with the securement means so that the selected first position of the securement means will conform to a selected core stack height. The elective means selectively sets or determines the effective length or height of the position determining means to conform the first position of the securement means to the given core stack height.

In accordance with yet another aspect of the present invention there is apparatus for forming insulators of selected lengths from a strip of insulative material and for inserting the insulators into the predetermined slots of the core concurrently with the coil side turn portions. The apparatus includes an insulator guide housing having circumferentially spaced and axially extending guide apertures aligned with predetermined ones of the axially extending core slots to receive and guide insulators for insertion into the slots. Insulator pushers are slidably disposed with respect to the guide apertures and mounted for axial movement relative to the core to insert the insulators into the slots. The apparatus also includes guide means for containing a section of the strip of insulative material and feed means for repeatedly advancing the strip along the guide means. Adjustable feed stop means is effective to interrupt each material advancing action of the feed means upon advancement of a predetermined length of the strip so that selected lengths of the strip are advanced for subsequent severance and formation into shaped insulators. The elective means is effective to control the position of the feed stop means so that the selected lengths of the strip advanced conform to the given stack height.

The subject matter which we regard as our invention is particularly pointed out and distinctly claimed in the concluding portion of the specification. The invention itself, however, taken with further objects and advantages thereof, may be best understood by reference to the following description taken in conjunction with the accompanying drawings in which:

BRIEF DESCRIPTION OF THE DRAWINGS

FIG. 2 is a somewhat simplified elevational view of a portion of the apparatus generally as seen along line 2—2 of FIG. 1, with the apparatus set for use with cores of a first given stack height and showing the positions of certain of the components at the beginning of the insertion operation;

FIG. 3 is a somewhat simplified elevational view of another portion of the apparatus generally as seen along line 2—2 of FIG. 1, with the apparatus set for use with cores of the first given stack height and showing the positions of other of the components at the beginning of the insertion operation;

FIG. 4 is a somewhat simplified elevational view of a portion of the apparatus illustrated in FIG. 2 but showing certain components in other of their positions;

FIG. 5 is a view similar to FIG. 2 but showing the positions of certain of the components at another point in the insertion operation;

FIG. 10 is a view similar to FIG. 3 but with the apparatus set for use with cores of the second given stack height;

FIG. 11 is a somewhat simplified elevational view of a portion of the apparatus generally as seen along line 11—11 in FIG. 1, but with the apparatus set for use with cores of the second given stack height;

FIG. 12 is an enlarged view of a portion of the assembly illustrated in FIG. 11, partly broken away and partly in section for purposes of illustration;

FIG. 13 is a view generally as seen along line 13—13 in FIG. 11;

FIG. 15 is a plan view of the control members used in the apparatus of the exemplification;

FIG. 15a is an elevational view as seen along line a—a of FIG. 15;

FIG. 15b is an elevational view as seen along line b—b of FIG. 15;

FIG. 15c is an elevational view as seen along line c—c of FIG. 15;

FIG. 15d is an elevational view as seen along line d—d of FIG. 15;

FIG. 16a is a schematic development diagram showing the relationship between the control surfaces of control member 60;

FIG. 16b is a schematic development diagram showing the relationship between the control surfaces of control member 76;

FIG. 16c is a schematic development diagram showing the relationship between the control surfaces of control member 77;

FIG. 16d is a schematic development diagram showing the relationship between the control surfaces of control member 89;

FIG. 16e is a schematic development diagram showing the relationship between the control surfaces of control member 90;

FIG. 16f is a schematic development diagram showing the relationship between the control surfaces of control member 139.

DESCRIPTION OF THE PREFERRED EMBODIMENTS

Figure 1:
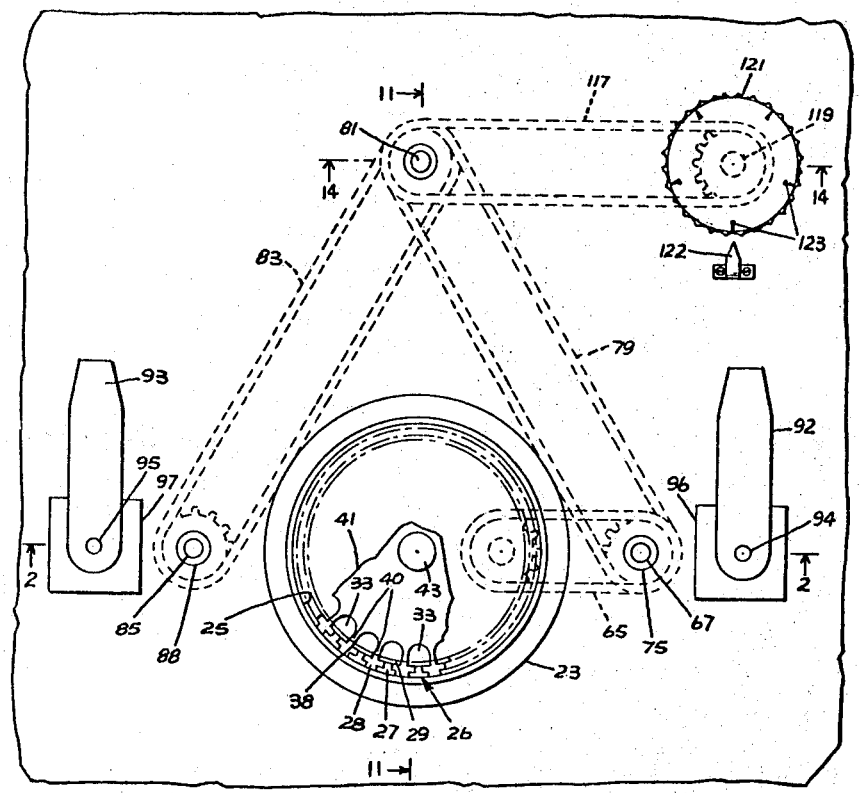
FIG. 1 is a somewhat simplified partial plan view of an apparatus for forming insulators of selected lengths and for inserting insulators and coil side turn portions into the slots of a magnetic core having a given stack height within a predetermined range of stack heights, according to one form of the present invention.

Referring now to the drawings, and particularly to FIGS. 1–4, there is illustrated, in somewhat simplified form, improved apparatus 20 for inserting coil side turn portions of a group of electrical coils formed of conductor wire into predetermined axially extending slots of a magnetic core and, if desired, forming and concurrently inserting insulators of appropriate length. It will be understood that, for purposes of illustration, any magnetic core and coils have been omitted from FIG. 1 while they are shown in phantom in FIGS. 2–4. The apparatus 20 includes a support 21 in the form of a plate 22 and a generally cylindrical central housing 23. For purposes of illustration the support is shown with the plate 22 disposed generally horizontally and the central cylindrical housing extending generally vertically. In actual practice, quite often the support will be disposed so that the housing 23 projects upwardly but is tilted toward the operator. A stationary support and stop plate 24 is positioned parallel to and spaced somewhat from the plate 22.

The housing 23 is provided with a central, axially extending bore 25. Spaced around the bore and securely fastened thereto by some suitable means such as screws (not shown) are a plurality of insulator guides 26. The number of insulator guides corresponds to the number of teeth of stator cores which are to be used with the apparatus, there being one guide 26 for each tooth of the core. As best seen in FIG. 1, the guides 26 have recesses 27 on each side thereof forming slots 28, which serve as guides for insulators, whether wedges or between phase insulators, to be introduced into a magnetic core. Each of the guides 26 includes an axially extending tab 29 at its outer end and the tabs serve as supports for the core, with each tab 29 engaging a corresponding tooth of the core. To this end FIG. 2 shows, in phantom line, a core 30 mounted on the insulator guides. The core includes an outer yoke section 31 and a plurality of inwardly extending teeth forming coil and insulator receiving slots 32. Radially inwardly of the insulator guides and aligned therewith, there is provided a plurality of axially extending divider blades 33. In the exemplification there is one divider blade for each insulator guide with the radially outer portion of the divider blade engaging the radially inner portion of the associated insulator guide. In the exemplification the divider blades 33 are shown as axially extending finger like members which are securely fastened to or formed integrally with a plug 34 having a central axial extension 35 at its other end. The opposite end of the axial extension is formed with a plate section 36 which is disposed generally parallel to the plates 22 and 24. The divider blade 33, plug 34, axial extension 35 and plate section 36 together form an integral divider blade section generally designated by the numeral 37. The divider blades 33 are angularly spaced apart and define therebetween turn-receiving gaps 38 which receive and align turns of coils to be inserted into a stator.

There is also provided turn insertion means including a plurality of coil turn feeder blades 40 with each of the coil turn feeder blades 40 being positioned in a turn-receiving gap 38 between an adjacent pair of divider blades 33. In the exemplification the turn feeder blades 40 are formed as radial extensions of a head 41. The head 41 also includes an elongated post or rod 42 which extends axially through and beyond the divider blade section 37. The head also is formed with an operating handle 43 which extends axially upwardly (as seen in FIG. 2). A slip clutch generally indicated at 44 is mounted to the underside of plate 36 and closely surrounds the rod 42 to releasably secure together the coil turn feeder blades 40 and the divider blade section 37 for concurrent axial movement.

A more detailed description of an apparatus of the general type thus far described may be had by reference to U.S. Pat. No. 3,324,536. Such an apparatus, including finger like divider blades and coil turn feeder blades formed as short generally radial extensions of a head or stripper, is shown for purposes of illustration only and other forms of coil turn insertion mechanisms could be utilized. By way of further example, a divider blade section, including a number of generally arcuate spaced apart divider blades, and a plurality of generally arcuate coil turn feeder blades disposed between the divider blades, such as that shown and described in copending application Ser. No. 101,638 filed for Richard B. Arnold on Dec. 28, 1970 (now U.S. Pat. No. 3,722,063) and assigned to General Electric Company, assignee of the present invention, also could be readily utilized.

Referring now to FIGS. 2 and 3, it will be seen that various of the elements shown in FIG. 3 are in fact extensions of certain of the elements shown in FIG. 2. An insulator guide housing 45 is positioned between the plates 22 and 24 and rotatably mounted about the axial extension 35 of the divider blade section by means of bearings 46. The insulator guide housing 45 has a plurality of circumferentially spaced and axially extending guide apertures 47 positioned around its outer surface. For instance, if the insulator guides 26 form 24 insulator guide slots 28 then there will be 24 insulator guide apertures 47 with each aperture alighed with one of the slots. It will be understood that the guide housing 45 may be rotated about the extension 35 by any suitable means to bring individual ones of the apertures into alignment with an insulator forming mechanism so that insulators can be transferred from the forming mechanism into the apertures. However, at least after the insulators have been received in the housing, each of the apertures is brought into alignment with a corresponding one of the guide slots so that the insulators in the housing may be forced out of the apertures and through the slots 28.

The plate 24 includes a plurality of openings 48 spaced so that each of the openings 48 is axially aligned with an insulator guide aperture 47 and an insulator slot 28. A plurality of elongated insulator pushers 50 are provided, with each of the pushers being arranged to move through an associated insulator guide aperture 47 and insulator guide slots 28 so as to move an insulator (such as those shown at 51) from the insulator guide housing into a core 30. To this end the pushers 50 extend downwardly through appropriate openings 52 in the plate section 36 and, at their lower ends, are joined to a base 53. For ease of illustration the pushers 50 and base 53 are shown as being formed integrally. However, it will be understood that in practice the pushers 50 often will be formed as individual elements which are then firmly attached to a base 53 so as to move therewith.

Figure 6:
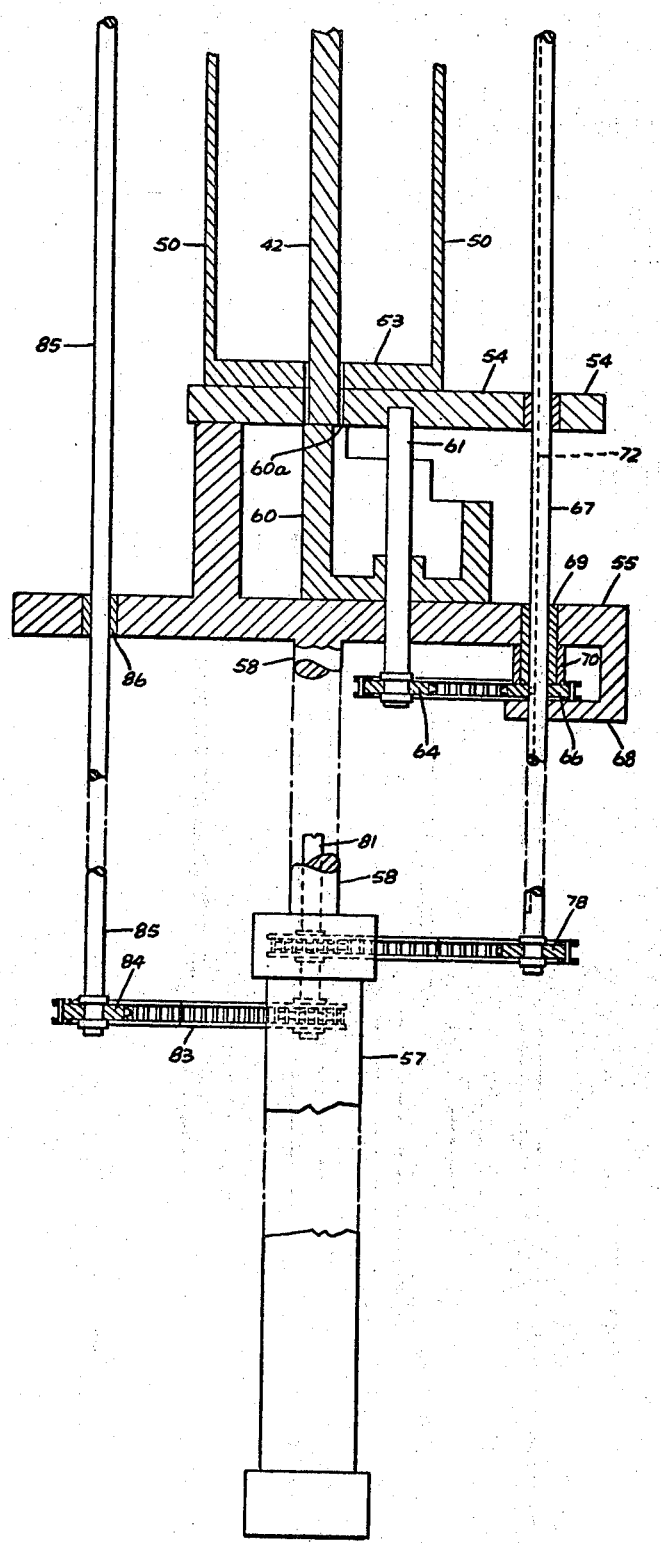
FIG. 6 is a view similar to FIG. 3 but showing the positions of certain other of the components at the point in the insertion operation corresponding to FIG. 5.

In the exemplification the base 53 is firmly connected to a plate 54 by some suitable means such as welding or screws (not shown). The plate 54 is spaced from a plate 55 by means of a curved elongated wall 56. The plate 55 is attached to a drive means in the form of a constant stroke cylinder 57 by means of a shaft or piston 58 (see FIG. 6 for example).

A control member 60 is positioned between the plates 54 and 55 and is firmly mounted to a rotatable shaft 61. The shaft 61 is rotatably mounted between the plates 54 and 55 so that various control surfaces, such as those shown at 60a, 60b and 60c of control member 60, may be brought into alignment with openings 62 and 63 in base 53 and plate 54 respectively. The control surface in alignment with the openings 62, 63 is effective to engage the distal end of post or rod 42 upon a predetermined axial movement of the plate 55. Each of the control surfaces of member 60 is provided at a different height from the base of the control member 60 so that the predetermined movement of the plate 55 before the control member 60 engages the end of rod 42 may be selectively varied by varying the rotational positioning of the control member 60.

To this end, a sprocket 64 is firmly mounted adjacent the distal end of the shaft 61 for rotational movement therewith. A chain 65 connects the sprocket 64 to a sprocket 66 which is mounted about a shaft 67. The sprocket 66 is positioned between the main portion of plate 55 and an extension 68 which is spaced from the plate 55. The sprocket 66 is held adjacent the extension 68 by means of a bearing 69 and spacer 70 so that the sprocket 66 moves longitudinally with the plate 55. The sprocket includes a tab or ear 71 which is received in a longitudinally extending slot 72 formed in the shaft 67. Thus the sprocket 66 rotates with the shaft 67 but is longitudinally movable along the shaft. The shaft 67 is rotatably and slidably supported in plate 54 by means of a bearing 73 and is rotatably supported in plate 24 by a bearing 74 and in plate 21 by a bearing 75. Adjacent the underside of plate 24 another control member or stop 76 is securely mounted to the shaft 67. The control member 76 includes a plurality of control surfaces such as those shown at 76c, 76d and 76e. Each of these control surfaces is at a different height with respect to the base of the control member 76 than the other control surfaces. Adjacent the upper side of plate 24 yet another control member 77 is firmly mounted to shaft 67 for rotation therewith. This control member also includes a number of control surfaces, such as those shown at 77a, 77d, and 77e, each of which is positioned at a different height with respect to the base of the control member 77. Thus, as shaft 67 is rotated, the control members 60, 76 and 77 are rotated and change the relative positioning of their various control surfaces.

A sprocket 78 is firmly mounted adjacent the distal end of the shaft 67 for rotation therewith and is connected by means of a chain 79 to a similar sprocket 80 mounted for rotation with a shaft 81. Another sprocket 82 is also mounted for rotation with the shaft 81 and is connected by means of a chain 83 to a sprocket 84, mounted adjacent the distal end of a shaft 85 for rotation therewith. The shaft 85 is longitudinally and rotatably supported in plate 55 by a bearing 86, is rotatably supported in plate 24 by a bearing 87 and in plate 21 by a bearing 88. A control member 89 is mounted for rotation with shaft 85 adjacent the underside of plate 24 and includes a plurality of control surfaces, such as those shown at 89a, 89b and 89e, with each of the control surfaces being at a different preselected height with respect to the base of the control member 89. A control member 90 is mounted for rotation with the shaft 85 adjacent the upper surface of plate 24. Control member 90 also includes a number of control surfaces, such as those shown at 90a, 90b and 90c, each of which is at a different height with respect to the base of control member 90. The control members 76, 89 function as stops for the divider blade section. To this end in each arcuate setting of the control members 76 and 89 they have matching control surfaces which are disposed to be in interfering relationship with plate section 36 as plate section 36 moves toward plate 24 (upwardly as seen in the FIGS.). Thus as the shafts 85 and 67 are rotated, the control members 76, 89 are rotated to bring matching control surfaces into interfering relationship with the plate section 36 so that the selected matching control surfaces are effective as stops for the divider blade section. In the setting shown in FIGS. 2 and 3 the effective control surfaces are 76e and 89e.

Figure 9:
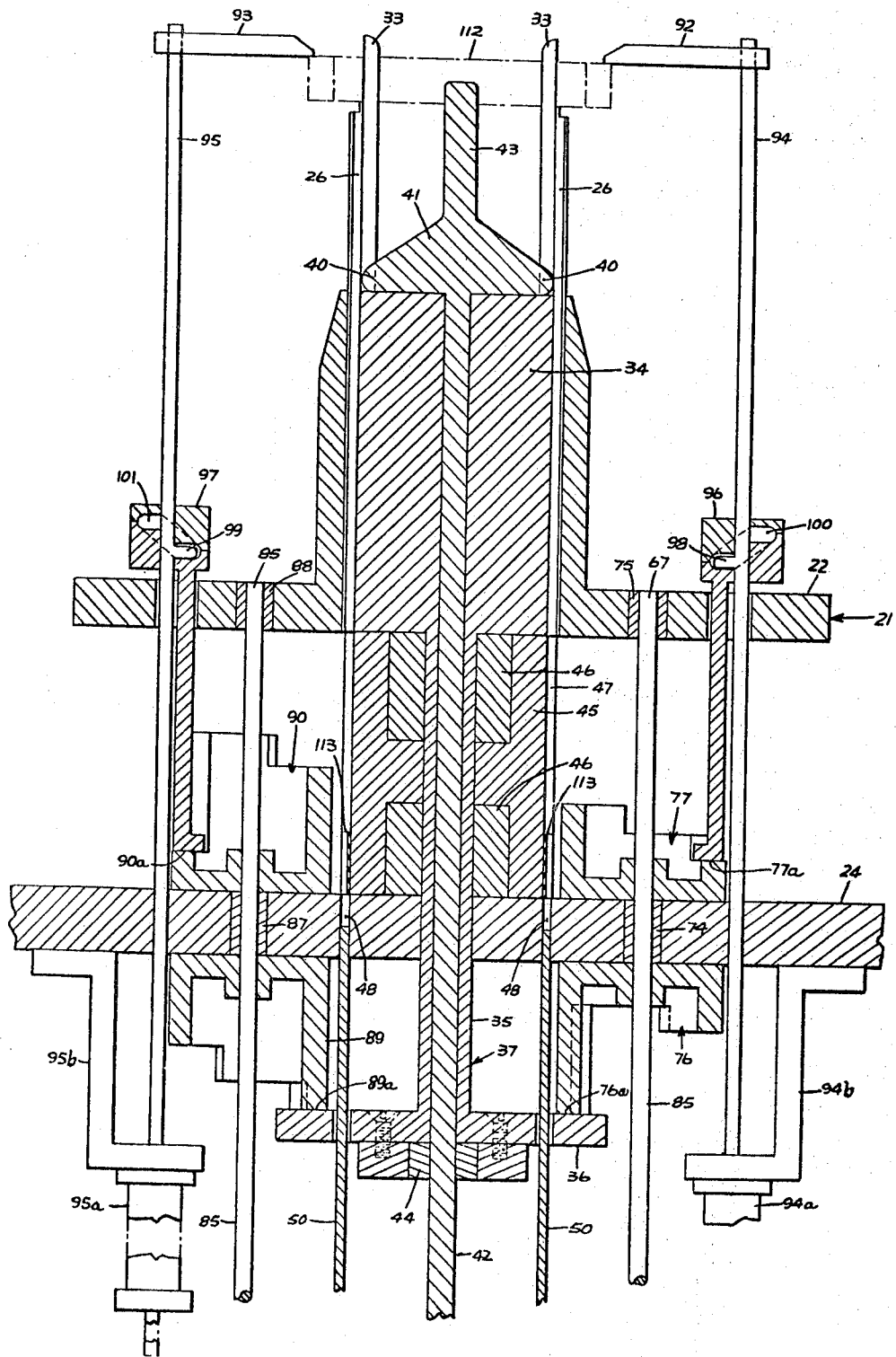
FIG. 9 is a view similar to FIG. 2 but with the apparatus set for use with cores of a second given stack height.

When coil side turns, and insulators if desired, are inserted into a core such as 30 engagement between individual conductors and the sides of the core slots may tend to cause the core to lift off of the tabs 29. This could cause difficulty in properly positioning the coils and insulators. In order to avoid this difficulty there may be provided a core securement means for retaining the core against axial movement during the insertion operation. In the exemplification the core securement means takes the form of a pair of latches or dogs 92 and 93. Each of the latches has a selectable first position (as shown in FIGS. 2 and 9 for instance), restraining a core from axial movement and a second position removed therefrom, as illustrated in FIGS. 1 and 4. The latches are mounted upon an actuator rod 94 and 95 respectively which are elongated pistons for constant stroke cylinders 94a and 95a respectively. The cylinders 94a and 95a are mounted below plate 24, out of interfering relationship with control members 76, 89, by brackets 94b and 95b. Each of the elongated pistons 94, 95 extends through a split block cam 96 and 97 respectively. Each piston includes a follower lug 98 and 99 respectively which is received in a cam track 100, 101 respectively in the split block cams. The lower portion of each split block cam 96, 97 is formed integrally with or securely mounted to an elongated actuating rod 102, 103 respectively.

The piston 94 and actuating rod 102 extend through an elongated opening 104 in plate 21 and the rod 102 has, at its distal end, a tab 102a which projects outwardly so as to be in interfering relationship with the underside of plate 22. Similarly piston 95 and actuating rod 103 extend through an elongated opening 106 in plate 22 and the distal end of rod 103 is provided with a similar tab 103a positioned to be in interfering relationship with the underside of plate 22.

When the cylinders 94a, 95a are actuated to move the pistons 94, 95 upwardly from the position shown in FIG. 2 to the position shown in FIG. 4, the cams 96, 97 move the pistons until the tabs 102a, 103a engage the underside of plate 22 to stop the cams. Thereafter the followers 98 and 99 move within the cam tracks 100 and 101 to rotate the latches 92, 93 so as to remove them from alignment with the core. When the cylinders 94a, 95a are actuated in the reverse direction that is to move the pistons 94, 95 downwardly (as seen in the FIGS.) the cam blocks 96, 97 and actuating rods 102, 103 move downwardly until the distal ends of the actuating rods engage corresponding control surfaces of the control member 77, 90 which stops the cams. Thereafter the cam followers 98, 99 move within the cam tracks 100, 101 to rotate the latches 92 and 93 into engagement with or in interfering relationship with the core. Thus the control members 77, 90, at any time, have an effective control surface, that is a surface in axial alignment with the actuating rods 102, 103. Rotation of the shafts 67, 85 rotate the control member 77, 90 to selectively provide different corresponding ones of their control surfaces as the effective surface.

It will be seen that, since the sprockets 64, 66, 68, 80, 82 and 84 are all interconnected by chains 65, 79 and 83, rotation of shaft 81 will cause all of the control members to be rotated in the same direction to select different predetermined control surfaces of control members 60, 76, 77, 89 and 90 as the effective surfaces. In FIGS. 2–8 these control members have been set to select the various control surfaces to correspond or conform to a core 30 having a maximum core stack height within a predetermined range of core stack heights. FIGS. 2 and 3 show the position of the various elements just before the coil side turn portions and insulators are inserted into the slots 32 of the core. It will be noted that insulators 51 of the appropriate length have been formed and placed in the insulator guide apertures 47 of the insulator guide housing 45; that appropriate coils, generally indicated at 110, have been placed in the gaps 38 formed by the divider blades 33; and that the cylinders 94a, 95a have been actuated to bring the core securement means or latches 92, 93 into position restraining axial movement of the core. The insertion of the coil side turn portions and insulators is now accomplished by actuating cylinder 57 so as to move shaft 58 upwardly through its full stroke.

During the first increment of travel or first portion of the stroke of shaft 58 only the insulator pushers are moved so as to bring the insulator pushers 50, and thus the insulators 51, into a predetermined position with respect to the coil turn feeder blades 40. More specifically the insulator pushers 50 rise to a position in which the leading edge of the insulators 51 is just below the coil turn feeder blades 50, at which time the first increment of travel of the drive means is concluded. The first increment of travel may be understood by comparing FIGS. 5–6, which correspond to the end of the first increment of travel (for a core of the stack height of core 30), with FIGS. 2 and 3 which represent the beginning position for such a core. It will be noted that, at the end of the first increment of travel of shaft 58, the leading edge of insulators 51 just trail the coil turn feeder blades 40 and that the effective control surface 60a of control member 60 is just in engagement with the distal end of rod 42.

Figure 7:
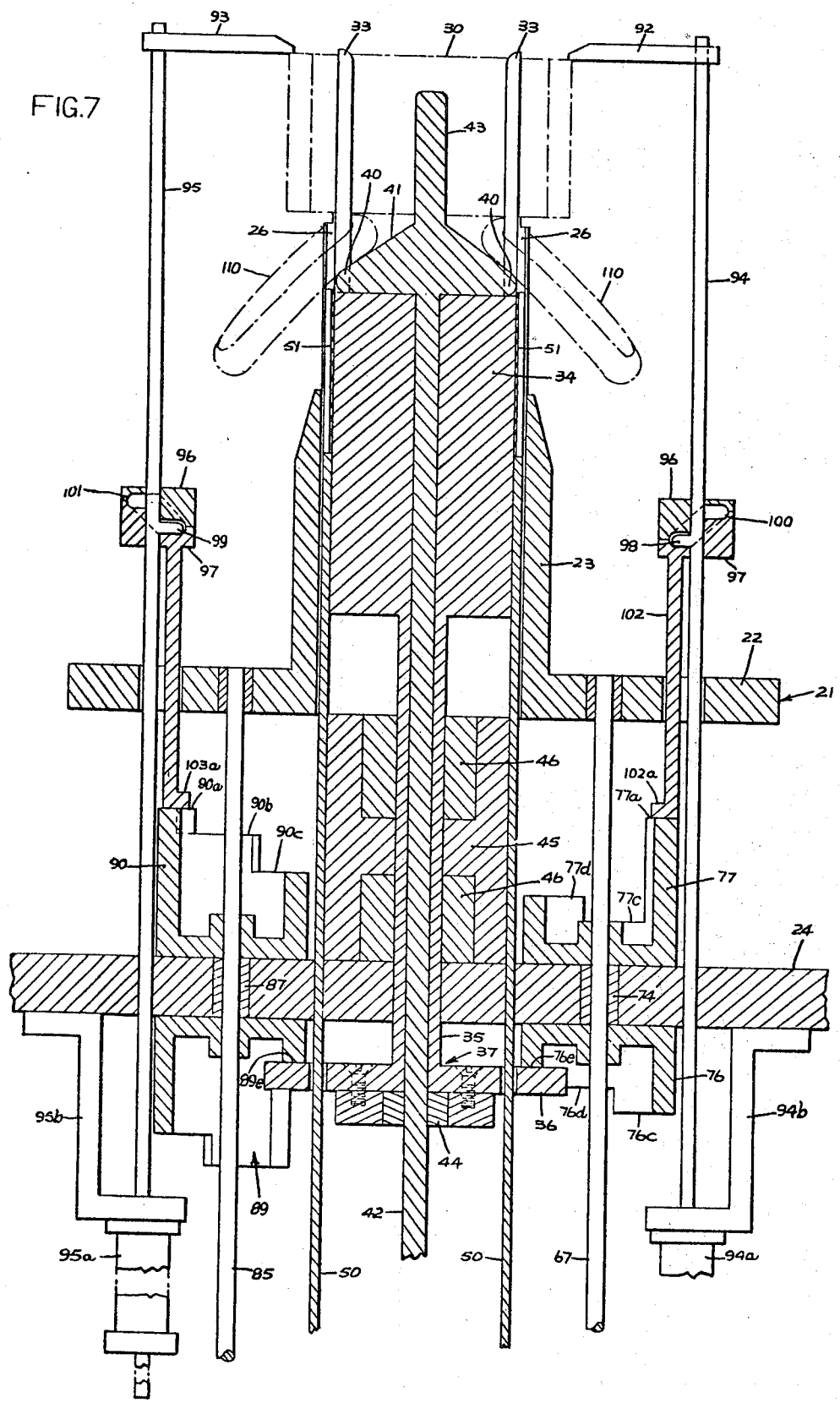
FIG. 7 is a view similar to FIG. 2 but showing the positions of certain of the components at yet another point in the insertion operation.

Continued movement of shaft 58 causes plate 54 to continue upward movement of the insulator pushers 50 and concurrently causes control member 60, acting through control surface 60a, to move rod or post 42 upwardly. The post 42 moves head 41 and coil turn feeder blades 40 upwardly. The connection between the post 42 and plate section 36 provided by slip clutch 44 moves the plate section 36, and thus the entire divider blade section including divider blades 33, upwardly. This movement continues until plate section 36 engages control surfaces 76e and 89e of control members 76 and 89, as seen in FIG. 7. This concludes the second increment of travel of the drive means. By viewing FIG. 7, which shows the position of various of the components at the end of the second increment of travel of the drive means, it will be seen that during the second increment of travel the wedge pushers, coil turn feeder blades and divider section, including the divider blades, have moved upwardly concurrently until the divider blades 33 just project through the core 30, the turn feeder blades 41 have brought the coil group 110 to just below the core and, the leading edge of the insulators 51 still just trail the coil turn feeder blades.

The engagement of the plate section 36 with the control member 76, 89 prevents further axial movement of the divider blade section; however, the slip clutch 44 will allow the post 42 to move axially relative to the divider blade section so that the coil turn feeder blades 40 are free for continued axial movement.

Figure 8:
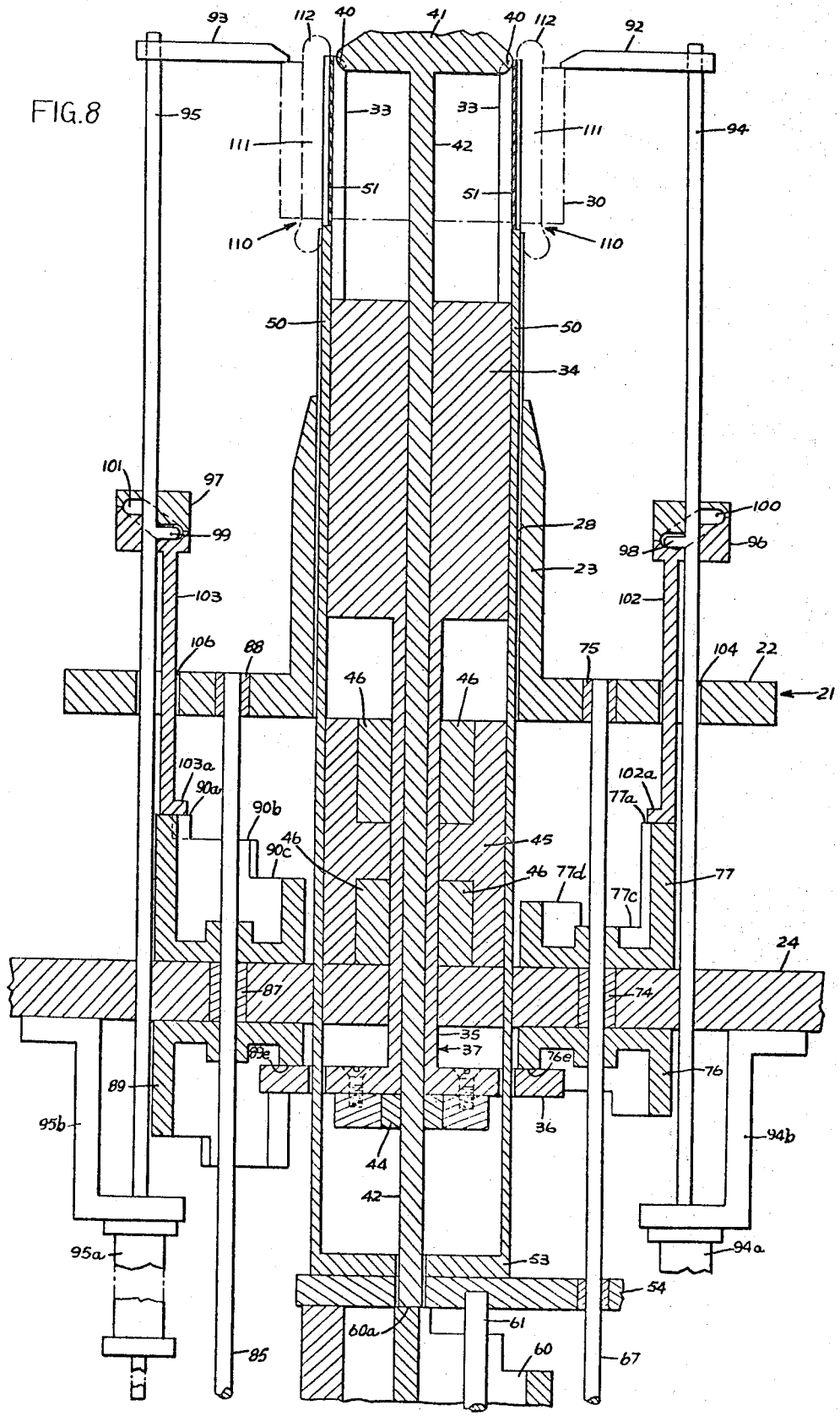
FIG. 8 is a view generally similar to FIG. 2 but showing the position of certain of the components at the end of the insertion operation.

Continued movement of the drive means causes plate 54 to continue axial movement of insulator pushers 50 and control surfaces 60a of control member 60 to continue axial movement of post 42 in the upward direction (as seen in the FIGS.). This third increment of movement continues until the drive cylinder 57 reaches the end of its stroke. The end of the third increment of travel is illustrated in FIG. 8. From FIG. 8 it will be seen that the coil turn feeder blades 40 have moved the coil turn side portions 111 into the axially extending slots of the core and have moved the axially outer end turn portions 112 out of the central bore of the core. At the same time the insulator pushers 50 have moved the insulators out of the slots 28 and into the axially extending slots 32 of the core.

The apparatus is now ready for removal of the core 30 and return to its original position for inserting the coil side turn portions, and insulators if desired, into another core. This is accomplished by first actuating cylinders 94a, 95a to remove the latches 92, 93 from interfering relationship with the core and then manual removal of the core from the apparatus. A subsequent actuation of cylinder 57 in the reverse direction, that is to withdraw its piston or shaft 58, will cause the wedge pushers 50 to be withdrawn to the position of FIGS. 2–3. However, it will not effect the return or withdrawal of the coil turn feeder blades 40 or the divider blades 33. The operating handle 43 is manually pushed downwardly (as seen in the FIGS.) in order to return the coil turn feeder blades 40 and the divider blades 33 to their original position.

It will be understood that while the insertion operation has been described by reference to first, second and third increments of travel of the drive means, as provided by the cylinder 57 and piston 58, the insertion operation actually takes place as one continuous motion. In normal operation the mechanism does not stop between the position illustrated in FIGS. 2–3 and the position illustrated in FIG. 6, for a core having a stack height indicated by 30.

FIGS. 9 and 10 illustrate the exemplification apparatus set to insert coil side turn portions and insulators into a core 112 having a minimum core stack height within a predetermined range of core stack heights. Comparing FIGS. 2 and 3 with FIGS. 9 and 10 it will be seen that for a maximum given stack height within the predetermined range of stack heights the highest control surface 60a of control member 60 is effective, the lowest control surfaces 76e and 89e of control member 76 and 89 are effective and the highest control surfaces 77a and 90a of control members 77 and 90 are effective; while, for a core of a minimum stack height within the range of given stack heights, the minimum height control surface 60e of control member 60 is effective, the maximum height control surfaces 76a and 89a of control members 76 and 89 are effective and the minimum height control surfaces 77a and 90a of control members 77 and 90 are effective.

With a maximum stack height, the insulators 51 are long, and a relatively short first increment of movement until control member 60 engages the end of post 42 brings the insulator pushers 50 into the proper position with relation to the turn feeder blades 40, that is with the leading edge of the insulators just trailing the coil turn insertion blades. With a shorter stack height the insulators 113 will be substantially shorter and the longer first increment of travel of the drive means provided by the control surface 60e before it engages the end of post 42 causes the insulator pushers 50 to travel further axially before the coil turn insertion blades 41 begin to move. This again places the insulator pushers 50 in a predetermined position relative to the coil turn feeder blades, that is with the leading edge of the insulators 113 just trailing the coil turn feeder blades 40. With a maximum height core such as 30 it is necessary to move the divider blades 33 a maximum distance so that they will project slightly beyond the outer surface of the core. In the setup of FIGS. 2 and 3 the minimum height control surfaces 76e and 89e being effective allows maximum movement of the divider blade section so that the divider blade will reach the desired position before the control member 76, 89 halt movement of the divider blade section. With a minimum stack height core 112 the divider blades 33 already project through the core so that there is no need to move the divider blade section, thus the maximum height control surfaces 76a and 89a are utilized. This prevents any movement of the divider blade housing and means that the second increment of travel of the drive means equals zero. The selection of the control surface of control member 60 to determine the first increment of travel also determines the amount of travel of the coil turn feeder blades as they move a distance equal to the amount of stroke of piston 58 remaining when the control member 60 engages the post 42. Thus for a maximum stack height core 30 the maximum height control surface 60a is made effective, to provide maximum movement of the coil turn feeder blades 40 and for a minimum stack height core 112 the minimum height control surface 60e of control member 60 is made effective to provide minimum movement of the coil turn feeder blades 40.

The control members 60, 76, 77, 89 and 90 of the exemplification have been shown as each having five distinct control surfaces to provide a positive, easily selectable control for five distinct predetermined core stack heights within a predetermined range of core stack heights. It will be understood that the various control members could be provided with other numbers of distinct control surfaces or with a control surface having a continuous slope between a maximum height and a minimum height in order to provide a continuously variable setting for any stack height within the predetermined range of stack heights.

Figure 14:
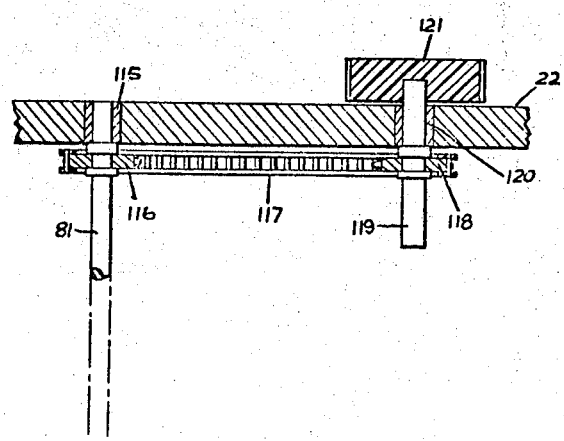
FIG. 14 is a fragmentary elevational view generally as seen along line 14—14 in FIG. 1.

There is provided elective means for selectively determining which control surfaces of the control members is effective at any one time. Referring now particularly to FIGS. 1 and 14 it will be seen that the upper end of shaft 81 is rotatably mounted in plate 22 by means of a bearing 115, and a sprocket 116 is mounted to shaft 81 for rotation therewith. A chain 117 connects the sprocket 116 to a sprocket 118 which, in turn, is mounted for rotation with a stub shaft 119. The shaft 119 is rotatably mounted in the plate 22 by a bearing 120 and a control knob 121 is securely mounted on the distal end of the stub shaft 119. Manual rotation of the control knob 121 will drive shaft 81 through sprocket 118, chain 117 and sprocket 116. As previously described, rotation of shaft 81 causes the various control members to rotate for selectively setting predetermined ones of their control surfaces to be effective at any one time. A stationary indicator 122 is mounted on the outside of plate 22 and is used in conjunction with a number of indication points 123 to show when the apparatus has been set for a core of a particular given stack height. It will be understood that, if the control members are provided with continuously varying height control surfaces, the control knob 121 could be marked in a suitable manner to indicate any number of stack heights.

The apparatus thus far described includes an insertion mechanism which is angularly stationary. In some applications it may be desired to have the insertion mechanism rotate, as when the apparatus is used to insert different phases such as, for instance, start and main windings. Such windings are mechanically and electrically offset from each other but, for operator convenience and assurance of proper placement, it may be desired to rotate the insertion mechanism or tooling so that the operator may always place the core on the mechanism in the same orientation. It will be understood that such a rotation may be provided, generally as has been provided with prior insertion mechanisms, merely by making the cylindrical housing 23 rotatable with respect to plate 21, by making the portion of plate 24 surrounding the insulator pushers 50 rotatable with respect to the remainder of plate 24 and by rotatably mounting base 53 on plate 54.

Considering now FIGS. 11 and 13 there is illustrated a new and improved insulator forming mechanism in accordance with one form and another aspect of the present invention. The insulator forming mechanism includes an apparatus 124 for severing an advanced length of insulative material and inserting the severed advanced length into insulator guide apertures 47 of the insulator guide housing 45. There are a number of such severing and forming apparatus known in the art which can be usefully employed in the present invention. By way of example only and without limitation, one such severing and forming apparatus is shown and described in application Ser. No. 806,057 filed Mar. 11, 1969 for Richard B. Arnold and Dallas F. Smith (now U.S. Pat. No. 3,579,818) and assigned to General Electric Company, assignee of the present invention. For guiding a strip of insulative material to the severing and forming apparatus 24 there is provided a generally trough or channel like guide 125. At its end remote from the severing and forming apparatus the guide 125 may include a cover 126 to assure that the strip 127 of insulative material is properly seated in the guide. There is provided a holding means in the form of a pivoted pawl 128 having teeth 129 which engage the strip 127. The pawl 128 is mounted so as to allow the strip to advance toward the severing and forming apparatus 124 while, at the same time, preventing the strip from being moved away from that apparatus.

A feed means, including a feed pawl 130 having teeth 131, is provided for advancing selected lengths of the insulative strip material to be severed and inserted into the insulator guide housing 45. Viewing FIGS. 11 and 12 it will be seen that the feed pawl 130 is pivotally mounted by a pin 132 in a slot 133 formed in a feed block 134. A spring 130a is mounted in the feed block and bears against the pawl so as to bias the pawl into driving engagement with the strip 127 of insulative material. As the pawl 130 is moved toward the severing and forming apparatus 124, engagement of the teeth 131 with the strip 127 will advance the strip. When the pawl 130 is moved away from the severing and forming apparatus, the pawl will pivot slightly about pin 132 so that the pressure exerted on the strip 127 by the teeth 131 will not be excessive, the strip 127 being held against movement in this direction by the holding pawl 128.

In order to cyclically reciprocate the feed pawl 130 toward and away from the severing and forming apparatus 124 a drive rod 135 is pivotally connected to the feed block 134 by a pin 136. The other end of the drive rod 135 is pivotally connected to a rotatable drive wheel 137. As the wheel 137 is rotated it alternately raises and lowers the drive rod 135 which, in turn, tends to move the drive block 134 and drive pawl 130 toward and away from the severing and forming apparatus 124. In order that the movement of the drive block, and thus the drive pawl, is in proper relationship to the guide 125 and insulative strip 127, a guide rod 138 extends from the severing and forming apparatus parallel to the guide 125 and projects through an appropriate opening formed in the guide block 134. Thus as the drive rod 135 cyclically moves the feed block and feed pawl toward and away from the severing and forming apparatus, the guide rod 138 insures that their general path is parallel to the guide 125 for proper advancement of selected lengths of the insulated strip 127. In the event greater stability of feed block 134 along its path parallel to guide 125 is desired, two guide rods 138, one on each side of drive rod 135, for instance could be provided.

A control member or stop 139 is mounted on shaft 81 for rotation therewith so that a selected one of its control surfaces, such as 139f, 139d or 139e, will be placed in the path of travel of the end 140 of feed pawl 130 remote from the insulative strip 127. Thus, as the drive rod 135 moves the pawl 130 toward the severing and forming apparatus 124, the end 140 of the pawl will engage the effective control surface of control member 139 (that is the control surface in the path of travel of the end 140). This engagement causes the feed pawl 130 to pivot about the pin 132 so that its teeth are disengaged from the insulative strip 127 and the length of strip advanced for severance and insertion into the insulator guide housing 45 is determined. As each of the control surfaces of the control member 139 is at a different height or length from the base of the control member 139 each of these control surfaces is, when effective, at a different position along the path of the feed pawl and thus will provide an advanced length of a different dimension.

FIGS. 11 and 13 also illustrate certain components of a slightly modified insertion mechanism in which the divider blades and coil turn feeder blades are returned to their original position at the same time the insulator pushers 50 are returned. To this end, a collar 141 is mounted adjacent the distal end of the post 42 by some suitable means such as a pin 142 extending through the collar 141 and post. A plate 143 is slidably mounted about the post 42 above the collar 141 and each end of the plate is connected to a longitudinally extending rod 144. Each of the rods 144 extends through the base 53, the plate 54 and the base 55. The distal end of each of the rods is threaded as at 145 and has a nut 146 mounted thereon against the bottom of plate 55. With such an arrangement, during the insertion stroke of drive cylinder 57 the plate 143 will rise along the post 42 so that the action during the various increments of travel of the drive means is the same as previously described. However, when the drive cylinder 57 is actuated to move shaft 58 in the other direction all of the insulator pushers 50, the divider blade section 37 and the coil turn feeder blades 41 are retracted to their original position. The insulator pushers 50 move back as before, that is with the mechanism including the shaft 58, plate 55 and plate 54. After a first increment of retraction the plate 143 will engage the collar 141 and thus retract the post 42, which brings with it the coil turn feeder blades 40. The slip clutch 44 will allow the post 42 to move through the divider blade section 37 until the base of head 41 engages the upper portion of plug 34. Thereafter continued movement of the post 42 will also retract the divider blade section, including the divider blades 33 to their original position.

We have found that by proper sizing and positioning of the various components of the exemplification apparatus it is possible to make all the control members, that is 60, 76, 77, 89, 90 and 139, the same shape with proper positioning of the control surfaces being obtained by the selection of the orientation in which each of the control members is mounted on its associated shaft and the direction of rotation imparted to these shafts. FIGS. 15, 15a, 15b, 15c and 15d illustrate in more detail the overall configuration of such a control member which for purposes of discussion is indicated at 147. It will be seen that this member has a base 148 and a central hub 149, through which is an opening 150 for mounting the member about an appropriate shaft. A circumferential wall 151 extends around the edge of the base 148 and projects axially therefrom. The distal edge of the wall 151 is formed as five distinct control surfaces 147a, 147b, 147c, 147d and 147e, beginning with the highest control surface and going to the lowest control surface.

FIGS. 16a–16f illustrate the effective control surfaces of each of the control members 60, 76, 77, 89, 90 and 139 respectively as control knob 121 is rotated to set the apparatus for various given stack heights within a predetermined range of stack heights from the highest to the lowest. Each of the control surface diagrams is numbered to correspond to the individual control member to which is corresponds. It will be understood that, for a given stack height within the determined range of stack heights, each of the control members is set to have a predetermined one of its control surfaces effective to provide that the associated position, increment of travel or other relationship conform to the given stack height. This does not mean that either the height of the particular control surface or the relationship, increment of travel, etc., related thereto is exactly the same distance as the length of the particular stack. It means that different preselected lengths are provided for each stack height to assure appropriate operation of the apparatus for the given stack height.

Figure 17:
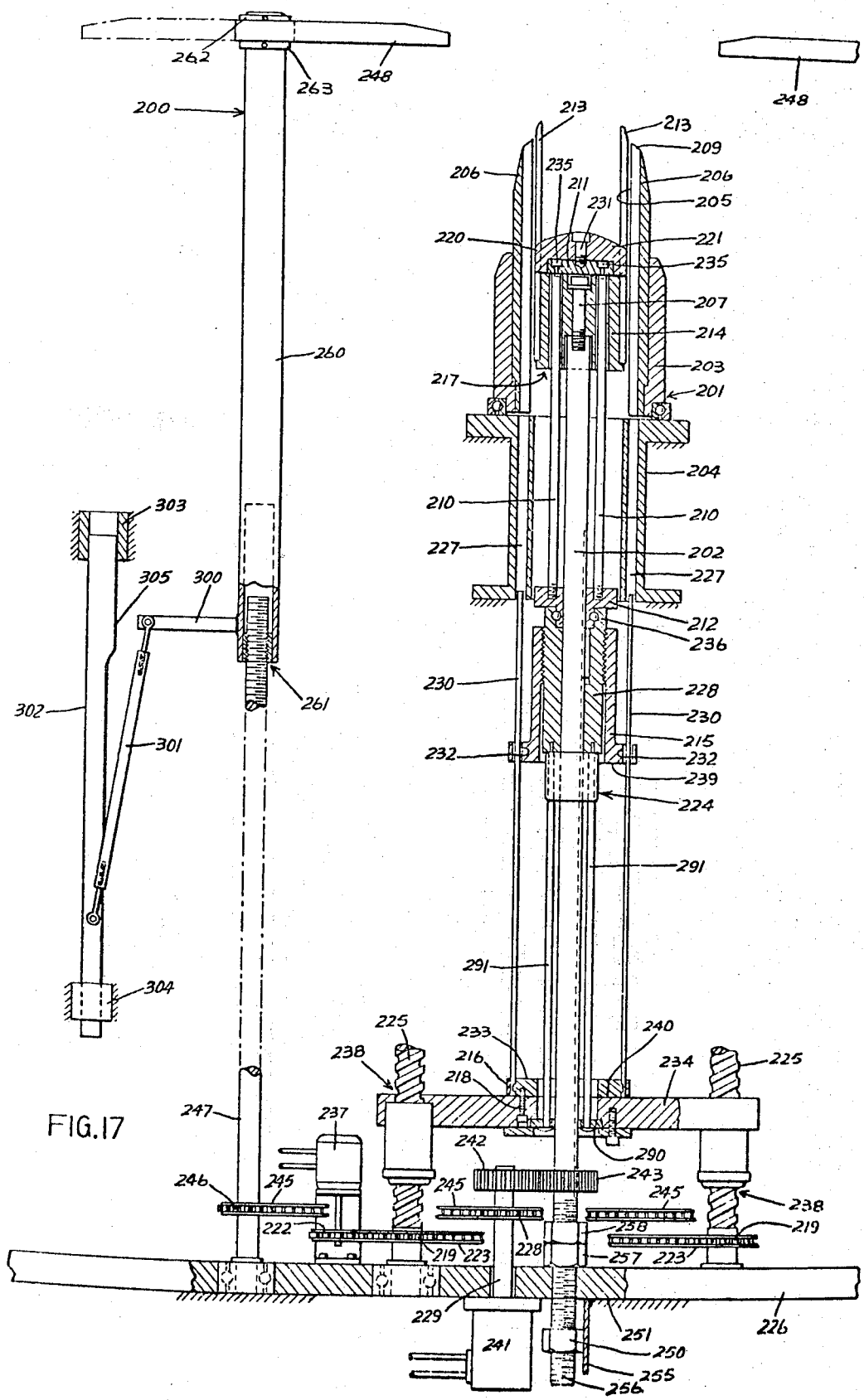
FIG. 17 is a somewhat simplified elevational view of another apparatus embodying the invention and with parts removed and broken away.

With reference now to FIG. 17, we have there illustrated, also in somewhat simplified form, apparatus 200 that exemplifies our invention. Magnetic cores and coils have been entirely omitted from FIG. 17, but it will be understood that the apparatus 200 may be useable with the same design and size ranges of cores and coils as apparatus 20.

The apparatus 200 includes a support 201 that includes a generally cylindrical central housing 203. The use and operation of housing 203 is substantially the same as that of housing 23 in FIG. 1. Moreover, the housing 203 may project upwardly as shown or it may be arranged to be non-vertically disposed, e.g., to tilt toward the operator. A stationary support 204 provides support for housing 23. This support 204 is illustrated as forming part of the frame or base for apparatus 200.

The housing 203 is provided with a central, axially extending bore 205. Spaced around the bore and securely fastened thereto by any suitable means are a plurality of insulator guides 206. The number of insulator guides corresponds to the number of teeth of stator cores which are to be used with the apparatus. The guides 206 have recesses on each side thereof that form slots which, as will be understood, serve as guides for insulators, whether wedges or between phase insulators, to be introduced into a magnetic core. Each of the guides 26 includes an axially extending portion 209 at its outer end and these portions serve as supports for a core.

Radially inwardly of the insulator guides and aligned therewith, there is provided a plurality of axially extending divider blades 213. There is one divider blade 213 for each insulator guide 206 with the radially outer portion of the divider blade engaging the radially inner portion of the associated insulator guide. The divider blades 213 are shown as axially extending finger like members which are securely fastened to or formed integrally with a plug 214 having a centrally disposed bore in which shaft 202 is held by bolt 207. The ead of bolt 207 is received in a pocket formed in plug 214 as will be appreciated from FIG. 17. The plug 214 is also provided with a plurality of guide holes 208 along which push rods 210 are freely slideable as will be explained in more detail hereinafter. The divider blades 213 and 214 together form an integral divider blade section generally designated by the numeral 217. The divider blades 213 are angularly spaced apart and define therebetween turn-receiving gaps which receive and align turns of coils to be inserted into a stator.

Apparatus 200 also includes turn insertion means in the form of a plurality of coil turn feeder blades 220. Each of the coil turn feeder blades 220 is positioned in a turn-receiving gap between an adjacent pair of divider blades 213. The turn feeder blades 220 are formed as radial extensions of a head 221. The head 221 is fastened by screw 231 to disc 211. Disc 211 in turn is fastened by screws 235 to push rods 210. Push rods 210 are fastened to a coupling member 212 that in turn is free to rotate relative to coupling member 236, but is constrained to move axially with coupling member 236. A slip clutch generally indicated at 224 is mounted to the underside of member 236 and closely surrounds the shaft 202 to releasably secure together the coil turn feeder blades 220 and the divider blade section 217 for concurrent axial movement.

Reference is now again made, for a more detailed description of apparatus of the general type thus far described, to U.S. Pat. No. 3,324,536. It will, of course, be understood that apparatus 200 could utilize coil turn insertion mechanisms other than that illustrated. For example, arcuate divider blades and generally arcuate coil turn feeder blades as shown in the above referenced copending application Ser. No. 101,638 (now U.S. Pat. No. 3,722,063) of Richard B. Arnold could be readily utilized.

An insulator guide housing generally similar to housing 45 of FIG. 2 may be used with the apparatus 200 but the details of such housing have been omitted from FIG. 17 for purposes of clarity of disclosure.

Insulator guide apertures 227 have, however, been shown in support 204, with each aperture 227 slidably receiving an elongated insulator pusher 230. Each of the pushers 230 will move through an associated insulator guide aperture and an insulator guide slot so as to move an insulator (such as those shown at 51 in FIG. 2) from the insulator guide housing into a core supported on the apparatus 200.

The pushers 230 extend downwardly through appropriate openings 232 in a control member 215 and, at their lower ends, are joined to a disc-like base 233. The pushers are clamped to base 233 by a conventional clamp ring 216. Thus, the pushers are constrained to move axially with the base 233.

In the apparatus 200, the base 233 is firmly connected to a platen 234 by screws 218. The platen 234 is attached to a drive means in the form of a hydraulic motor 237 by means of two ball screw assemblies 238, sprockets 219, 222, and chain 223. Each sprocket 219 is firmly fastened to a screw 225, and the screws 225 in turn are supported for rotation in bearings in fram member 226 and other not shown frame members.

The control member 215 is threaded onto a coupling member 228. Member 228 is keyed to shaft 202 for rotation therewith, whereas control member 215 is constrained from rotation by the wedge pushers disposed in apertures 232. Rotation of shaft 202 causes control member 215 to move axially relative to member 228. This in turn causes the height of the control surface 239 to be varied relative to the driving surface 240. The height or dimensional relationship of control surface 239 determines the length of increments of axial travel of platen surface 240 before control member 228 is engaged and driven by platen 234. Control member 228 does, of course, move axially along shaft 202.

The control surface 239 may be positioned at a different or selected height from the platen 234 by rotating shaft 202 by means of hydraulic motor 241 and gears 242, 243.

As will be understood, bolt 207 rotates with shaft 202 when gear 243 is driven by gear 242 even though plug 214 and blades 213 are constrained from rotation.

Motor 241 also drives, through sprocket 244, a chain 245. The chain 245 in turn drives two sprockets 246 (one of which is not shown). Each sprocket 246 in turn is keyed to a shaft 247 (one of which is not shown) which drives control members that control the height of latches or dogs 248.

For purposes of clarity, the shaft 247, sprocket 246, and control member that establish a selectable first position, (e.g., height) of dog 248 have not been shown. However, these parts are similar to the parts 246, 247, etc., shown in FIG. 17.

When platen 234 engages control surface 239 during axial movement of the platen, shaft 202 is moved axially and gear 243 is axially moved from gear 242 so that the gears disengage. During this increment of travel, stripper 221 and blades 213 will conjointly move in an axial direction. However, when the nut 250 strikes surface 251 of lower frame member 226, axial movement of shaft 202 (and thus divider blades 213) is arrested. Thereafter, slip clutch 224 slides axially along shaft 202 as platen 234 continues to drive wedge pushers 230 and stripper 221 in an axial direction.

It should now be understood that, concurrently with the selective setting of control member 215 by rotation of shaft 202, the distance or height of nut 250 relative to surface 251 is also adjusted, since flat bar 255 (welded to member 226) prevents rotation of nut 250 on shaft 202. Thus, the threaded portion 256 of shaft 202 and nut 250 cooperate to provide, in effect, a variable length for the stop nut 250. Jam nuts 257, 258 on the other hand provide a permanent, but nonetheless adjustable, fixed stop or limit with regard to axial movement of shaft 202 downwardly (as viewed in FIG. 17) relative to the frame of apparatus 200.

The threaded portions of shafts 247 and tubes 260, generally denoted at 261, form still another control member and, while motor 241 is actuated to selectively position stop nut 256 and control member 215, the latches or dogs 248 are concurrently moved up or down to a selectable first position as the shafts 247 and tubes 260 telescope into or out of one another.

The adjustment of all of these control members establishes desired relative positions and increments of travel of the component parts of apparatus 200 so that they will conform to the stack height of a given core, as will be understood. As will also be understood, the latches or dogs 248 of apparatus 200 are manually movable about tubes 260 from a second position (shown in phantom in FIG. 17), removed from a core supported on the apparatus 200.

The collars 262, 263 are provided to retain the dogs 248 on tubes 260 and yet permit an operator to swing the dogs between the selectable first position thereof and a second position thereof. The movement of dogs 248 about the axis of tubes 260 could, of course, be powered or mechanized if desired, however.

When coil side turns, and insulators if desired, are to be inserted into a core supported on apparatus 200, engagement between individual conductors and the sides of the core slots may tend to cause the core to lift off of the portion 209. In order to avoid difficulties associated with this, the latches 248 are used as just described.

It will be understood that sprockets 228, 246 and gears 243, 242 are all positively interconnected by chain 245 or shaft 229. Thus, rotation of shaft 229 will cause all of the control members and stop members just described to be concurrently adjusted so that the apparatus 200 may be rapidly set up for cores having selected height within the predetermined range of heights to be handled by apparatus 200. This adjustment is readily accomplished by placing a given core on portions 209, swinging dogs 248 over the core, and pushing an "UP" or "DOWN" button to actuate motor 241 in an appropriate direction to raise or lower the dogs to a first position thereof that conforms to the height of the given core. Concurrently, the relative increments of travel of the other portions of apparatus 200 will also be made to conform to the height of the given core.

One sequence of operation of apparatus 200 will now be described, assuming insulators are in position above the pushers 230, and winding coils are disposed in the gaps between selected pairs of blades 213.

The dogs 248 are first moved over the core. Then, during the first increment of travel or first portion of the upward stroke of platen 234 (as viewed in FIG. 17), only the insulator pushers 230 are moved so as to bring the insulator pushers, and thus the insulators, into a predetermined position with respect to the coil turn feeder blades 220. More specifically the insulator pushers rise to a position in which the leading edge of the insulators is just below the coil turn feeder blades 220, at which time the first increment of travel of the drive means is concluded.

At the end of the first increment of travel of platen 234 (due to actuation of motor 237), the leading edge of the insulators just trail the coil turn feeder blades 220 and the surface 240 of platen 234 is just in engagement with control surface 239 of control member 215.

Continued movement of platen 234 causes continued upward movement of the insulator pushers and concurrently causes control member 15 to move upwardly. In addition, shaft 202 is moved upwardly by slip clutch 224. The shaft 202 moves plug 214 and divider blades 213 upwardly. The control member 215 drives coupling members 228 and 212 upwardly and thus moves push rods 210 and stripper 221 upwardly. This conjoint movement continues until stop nut 250 engages surface 251. This concludes the second increment of travel of the drive means.

At the end of the second increment of travel of the drive means, the pushers 230, coil turn feeder blades and divider section, including the divider blades, have moved upwardly concurrently until the divider blades just project through the core, the turn feeder blades have brought the coil group to just below the core and, the leading edge of the insulators still just trail the coil turn feeder blades.

The engagement of the control stop nut 250 with the surface 251 of frame member 226 prevents further axial movement of the shaft 202 and thus the divider blades; however, the slip clutch 224 will allow the push rods 210 to move axially relative to the divider blades 213 so that the coil turn feeder blades 200 are free for continued axial movement.

Continued movement of the drive means causes platen 234 to continue axial movement of insulator pushers 230 and feeder blades 220. This third increment of movement continues until the coil turn side portions have been placed in the axially extending slots of the core and have moved the axially outer end turn portions of the coil turns out of the central bore of the core. At the same time the insulator pushers have moved the insulators into the axially extending slots of the core. Preferably, two limit switches are closely positioned relative to one another and the platen strikes the first one of these just as it nears the end of its travel. The first switch will slow hydraulic motor 237 and the second switch, located at the end of travel for platen 234, will reverse the direction of motor 237.

Thereupon, platen 234 will return to its initial position as shown in FIG. 17, strike still a third not shown limit switch, which switch in turn will de-energize motor 237.

As platen 234 returns to its bottom position, surfaces of disc 290 will engage the shoulders of the heads on pins 291, and retract slip clutch 224 toward frame member 226. Shaft 202 in turn in pulled by slip clutch 224 downwardly until jam nut 257 rests on member 226. However, the slip clutch, push rods 210, etc., continue to move to the position shown in FIG. 17 because retractor pins 291 are screwed into and retained by member 228.

The apparatus is now ready for removal of the core therefrom. This is accomplished by moving the latches 248 from interfering relationship with the core and then manual removal of the core from the apparatus.

It will be understood that while the insertion operation has been described by reference to first, second and third increments of travel, the insertion operation actually takes place as one continuous motion.

While elective means for selectively determining which control surfaces of the control members of FIGS. 1 and 14 are effective at any one time include the control knob 121, etc.; in the exemplification of FIG. 17, a core itself is used as a visual gauge and such means include pushbuttons or toggle switches, etc., that are used to energize motor 241 in the appropriate direction. In both exemplifications multiple components of apparatus are concurrently adjusted to conform with the actual axial height of a preselected core.

The apparatus 200 thus far described includes an insertion mechanism which is angularly stationary. In some applications it my be desired to have the insertion mechanism rotate, as hereinabove stated. It will be understood that such a rotation may be provided, generally as has been provided with prior insertion mechanisms, and for this reason, the housing 203 is rotatable with respect to member 204 as shown in FIG. 17.

The insulator forming mechanism of FIGS. 11 and 13 may be used with the apparatus 200. However, when this is done, the control member 261 of FIG. 17 is used to move arm 300 up or down, through turnbuckle 301, move sliding cam 302 up or down in stationary guides 303, 304.

Then the raised cam surface 305 of the cam 302 will be placed in the path of travel of the end 140 of feed pawl 130 (see FIG. 11) remote from the insulative strip 127. Thus, as the drive rod 135 moves the pawl 130 toward the severing and forming apparatus 124, the end 140 of the pawl will engage adjustable stop means, e.g., the effective control surface 305 of cam 302 (see FIG. 17). This engagement will cause the feed pawl to pivot about the pin 132 so that its teeth are disengaged from the insulative strip and the length of strip advanced for severance and insertion into the insulator guide housing 45 is determined.

Since cam surface 305 cam be moved to any desired height by control member 261, an advanced length of insulator of different dimensions is readily provided.

While the invention has been explained by describing various exemplifications thereof, embodied both in apparatus or equipment and in methods, it will be apparent that many modifications may be made in the exemplified methods and apparatus without departing from the spirit of the invention. It is therefore intended to cover all such equivalent variations as come within the scope of the appended claims.

What we claim as new and desire to secure by Letters Patent of the United States is:

1. Apparatus for inserting coil side turn portions of a group of electrical coils formed of conductor wire into predetermined axially extending slots of a magnetic core of a given axial height within a preselected range of axial heights and having axially extending slots in communication with a periphery of the core, the apparatus comprising: means including a plurality of turn feeder blades and turn-receiving gaps for inserting side turn portions into the predetermined slots of the core; supporting means for mounting said turn feeder blades and the core for relative movement in an axial direction; drive means effecting movement of said turn feeder blades relative to the core during a selected increment of travel of said drive means for inserting the coil side turn portions into the predetermined slots; core securement means having a selectable first position restraining the core from axial movement and a second position removed therefrom; power means effective selectively to move said core securement means between its first and second positions; control means associated with said core securement means to halt said core securement means at a selected first position, elective means effective concurrently to set the length of the selected increment of travel of said drive means to conform to the given core axial height and to conform the selected first position of said core securement means to the given core axial height.

2. Apparatus for forming insulators of selected lengths from a strip of insulative material and for inserting the insulators and coil side turn portions of a group of electrical coils formed of conductor wire into predetermined axially extending slots of a core of a given axial height within a preselected range of core axial heights and having axially extending slots in communication with a periphery of the core; the apparatus comprising: means including a plurality of coil turn feeder blades and turn-receiving gaps to receive coil side turn portions for insertion into the predetermined slots of the core; supporting means for mounting said turn feeder blades and core for relative movement in an axial direction for inserting the coil side turn portions into the predetermined slots; an insulator guide housing having circumferentially spaced and axially extending guide apertures aligned with predetermined ones of the axially extending slots of the core to receive and guide insulators to be inserted into the predetermined slots of the core; insulator pushers slidably disposed with respect to said guide apertures and mounted for axial movement relative to the core to insert the insulators into the slots; drive means for moving said insulator pushers relative to said turn feeder blades during a first increment of travel of said drive means and thereafter concurrently moving said turn feeder blades and said insulator pushers relative to the core; guide means for containing a section of the strip of insulative material; feed means for repeatedly advancing the strip along said guide means; first control means for interrupting each strip advancing action of the feed means so that selected lengths of insulative material are advanced; means for severing each advanced length and inserting it into a corresponding guide aperture; and elective means effective concurrently to set said first control means to conform the selected lengths of advanced insulative material to the given core axial height and to set the first increment of travel of said drive means to place said insulator pushers in a preselected position with respect to said coil turn feeder blades which conforms to the given axial height.

3. Apparatus as set forth in claim 2 further including: a divider blade section forming the gaps to receive the electrical coils of conductor wire for insertion into the core; connection means interconnecting said divider blade section and said turn feeder blades for moving said divider blade section relative to the core concurrently with said turn feeder blades; second control means associated with said divider blade section for halting movement of said divider blade section after a selected increment of travel of said divider blade section relative to the core; said elective means selectively setting said second control means to conform the selected increment of travel of said divider blade section to the given core axial height concurrently with the setting of the first increment of travel of said drive means.

4. Apparatus as set forth in claim 2 further including: core securement means having a selectable first position restraining the core from axial movement and a second position removed therefrom; power means effective selectively to move said core securement means between its first and second positions; third control means associated with said core securement means to halt said core securement means at a selected first position; said elective means selectively setting said third control means to conform the selected first position of said core securement means to the given core axial height concurrently with the setting of the first increment of travel of said drive means.

5. Apparatus for inserting coil side turn portions of a group of electrical coils formed of conductor wire into predetermined axially extending slots of a magnetic core of a given axial height within a preselected range of axial heights and having axially extending slots in communication with a periphery of the core, the apparatus comprising: a plurality of spaced apart divider blades to receive therebetween coils to be inserted into the core; a plurality of coil turn feeder blades, each coil turn feeder blade being positioned between an adjacent pair of divider blades; drive means for effecting movement of said coil turn feeder blades axially of the core during one increment of travel of said drive means and movement of said divider blades axially of the core concurrently with said coil turn feeder blades during a first portion of the one increment of travel of said drive means; a connector having a selectably variable effective length to operatively interconnect said drive means and said coil turn feeder blades to move said coil turn feeder blades during the one increment of travel of said drive means; a stop having a selectably variable length effective to halt said divider blades after the first portion of the one increment of travel of said drive means; and elective means for concurrently selecting the effective lengths of both said connector and said stop to conform both the one increment of travel of said drive means and the first portion of the one increment of travel of said drive means to the given core axial height.

6. Apparatus as set forth in claim 5 wherein: said connector and said stop each is a member having a base and a plurality of control surfaces spaced different predetermined lengths from said base, corresponding to different predetermined core axial heights within the predetermined axial height range; each of said connector and said stop being movably mounted so that only one of its control surfaces is effective at a time; said elective means concurrently moves said connector and said stop to make predetermined control surfaces of each of said connector and said stop effective, which predetermined control surfaces correspond to the given core axial height.

7. Apparatus for forming shaped insulators of different selected lengths from a strip of insulative material for insertion into selected slots of a slotted magnetic core, comprising: guide means for containing a section of the strip of insulative material; feed means engaging the strip for advancing the strip along said guide means; constant stroke power means operatively connected to said feed means for effecting periodic reciprocating movement of said feed means to repeatedly advance a section of the strip; and adjustable stop means effective to interrupt the material advancing action of said feed means upon advancement of a predetermined length of the strip so that selected lengths of the strip are repeatedly advanced for subsequent severance and formation into shaped insulators.

8. Apparatus as set forth in claim 7 further including elective means effective to adjust said stop means for interrupting the material advancing action of said feed means so that the predetermined advance lengths of the strip conform to a selected core axial height within a predetermined range of core axial heights.

9. Apparatus as set forth in claim 7 wherein: said adjustable stop means includes a member having a plurality of control surfaces aligned with different positions along the path of travel of said feed means; said member being selectively movable to bring a selected control surface into the path of travel of said feed means for interrupting the material advancing section of said feed means upon advancement of a selected length of the strip.

10. Apparatus as set forth in claim 9 further including elective means effective to move said member to bring a selected stop into the path of travel of said feed means.

11. Apparatus for inserting coil side turn portions of a group of electrical coils formed of conductor wire into predetermined axially extending slots of a magnetic core of a given axial height within a preselected range of axial heights and having axially extending slots in communication with a periphery of the core, the apparatus comprising: means defining a plurality of turn-receiving gaps; turn insertion means for inserting coil side turn portions into the predetermined slots of the core; supporting means for mounting said turn insertion means and the core for relative movement in an axial direction; drive means for effecting movement of said turn insertion means relative to the core during a selected increment of travel of said drive means; control means having a variable effective length to operatively interconnect said drive means and said turn insertion means to move said turn insertion means relative to the core during the selected increment of travel of said drive means; and elective means for moving said control means so that the portion of said control means effective to interconnect said drive means and said turn insertion means is of a selected height, whereby said selected increment of travel of said drive means conforms to the given core axial height.

12. Apparatus for inserting coil side turn portions of a group of electrical coils formed of conductor wire into predetermined axially extending slots of a magnetic core of a given axial height within a preselected range of stack heights and having axially extending slots in communication with a periphery of the core, the apparatus comprising: means including a plurality of turn feeder members and turn-receiving gaps for inserting side turn portions into the predetermined slots of the core; supporting means for mounting said turn feeder members and the core for relative movement in an axial direction; drive means effecting movement of said turn feeder members relative to the core during a selected increment of travel of said drive means for inserting the coil side turn portions into the predetermined slots; core securement means having a selectable first position restraining the core from axial movement and a second position removed therefrom, said core securement means being movable so that at least the selectable first position thereof is conformable to the core of given axial height; control means associated with said core securement means for establishing different selected first positions of the core securement means for cores of different given axial heights; elective means effective concurrently to set the length of the selected increment of travel of said drive means to conform to the given core axial height and to conform the selected first position of said core securement means to the given core axial height.

13. Apparatus for forming insulators of selected lengths from a strip of insulative material and for inserting the insulators and coil side turn portions of a group of electrical coils formed of conductor wire into predetermined axially extending slots of a core of a given axial height within a preselected range of core axial heights and having axially extending slots in communication with a periphery of the core; the apparatus comprising: means including a plurality of coil turn feeder members and turn-receiving gaps to receive coil side turn portions for insertion into the predetermined slots of the core; supporting means for mounting said turn feeder members and core for relative movement in an axial direction for inserting the coil side turn portions into the predetermined slots; an insulator guide housing having circumferentially spaced and axially extending guide apertures aligned with predetermined ones of the axially extending slots of the core to receive and guide insulators to be inserted into the predetermined slots of the core; insulator pushers slidably disposed with respect to said guide apertures and mounted for axial movement relative to the core to insert the insulators into the slots; drive means for moving said insulator pushers relative to said turn feeder members during a first extent of travel of said drive means and thereafter concurrently moving said turn feeder members and said insulator pushers relative to the core; guide means for containing a section of the strip of insulative material; feed means for repeatedly advancing the strip along said guide means; first control means for interrupting each strip advancing action of the feed means so that selected lengths of insulative material are advanced; means for severing each advanced length and inserting it into a corresponding guide aperture; and elective means effective concurrently to set said first control means to conform the selected lengths of advanced insulative material to the given core axial height and to establish the first extent of travel of the drive means.

14. Apparatus as set forth in claim 13 further including: a divider blade section forming the gaps to receive the electrical coils of conductor wire for insertion into the core; connection means interconnecting said divider blade section and said turn feeder members for moving said divider blade section relative to the core concurrently with said turn feeder members; second means associated with said divider blade section for halting movement of said divider blade section after a selected increment of travel of said divider blade section relative to the core; said elective means selectively setting said second means to conform the selected increment of travel of said divider blade section to the given core axial height concurrently with the establishing of the first extent of travel of the drive means.

15. Apparatus as set forth in claim 13 further including: at least one core restrainer having a selectable first position restraining the core from axial movement and a second position removed therefrom; restrainer control means associated with said core restrainer for establishing the selected first position of the core restrainer; said elective means selectively setting the restrainer control means to conform the selected first position of said core securement means to the given core stack height concurrently with the establishing of the first extent of travel of the drive means.

16. A method of inserting the side turn portions of at least one coil of electrical conductor wire into predetermined axially extending slots of a magnetic core of a given axial height within a preselected range of axial heights and having axially extending slots in communication with a periphery of the core, by holding a core in predetermined relation to coil placing apparatus and relatively moving coil turn feeder members of the apparatus relative to the core, the method comprising the steps of: selectively setting the length of an increment of relative travel of the turn feeder members and a core conforming to the given core axial height, and concurrently selectably setting a selected first position of core securement means in conformity with the given core axial height; placing side turn portions of the at least one coil in turn-receiving gaps associated with the coil turn feeder members; placing a core of substantially the given axial height in proximity to the coil turn feeder members; moving the core securement means to the selectably set first position thereof; and inserting the side turn portions of the at least one coil into slots of the core by effecting the selected increment of travel of the coil turn feeder members and the core.

17. The method of claim 16 further including the step of selectively setting the length of a conjoint increment of travel of the turn feeder members and a plurality of gap defining blades substantially concurrently with selectively setting the length of an increment of relative travel.

18. A method of forming shaped insulators of different selected lengths from a strip of insulative material for insertion into selected slots of a slotted magnetic core, the method comprising: engaging the strip of material with a mechanism at a first location and advancing the mechanism and the strip of material in a first path an amount conforming with a selected length; disengaging the strip of material and mechanism and continuing to advance the mechanism without continuing to advance the strip of material; and then returning the mechanism to the first location.

19. The method of claim 18 wherein the disengaging of the strip of material and mechanism is effected by interengaging the mechanism and a selectively movable stop means.

20. A method for inserting the side turn portions of at least one coil of electrical conductor wire into predetermined axially extending slots of a magnetic core of a given axial height within a preselected range of axial heights and having axially extending slots in communication with a periphery of the core, by relatively moving coil turn feeder members of a coil inserting apparatus relative to the core for a first increment of travel and by relatively moving divider blade members and coil turn feeder members during a preselected increment of travel, the method comprising the steps of: selectively setting the length of an increment of relative travel of the turn feeder members and a core conforming to the given core axial height, and concurrently selectively setting the length of a preselected increment of relative travel of the turn feeder members and divider blade members; placing side turn portions of the at least one coil in turn-receiving gaps associated with the divider blade members; placing a core of substantially the given axial height in proximity to the divider blade members; and inserting the side turn portions of the at least one coil into slots of the core by effecting the first increment of travel.

21. The method of claim 20 further including selectably setting a first position of core securement means concurrently with setting the length of a preselected increment of relative travel of the turn feeder member and divider blade members.

* * * * *